US012772971B2

(12) United States Patent
Berger et al.

(10) Patent No.: US 12,772,971 B2
(45) Date of Patent: Oct. 27, 2026

(54) CONFIGURABLE AGRICULTURAL SPRAY BOOM AND CONFIGURABLE DUAL SPRAYER SYSTEM

(71) Applicant: Centure Applications LTD, Tel-Aviv (IL)

(72) Inventors: Amir Berger, Kiryat Bialik (IL); Itzhak Khait, Kibbutz Ein Zivan (IL); Scott Grossen, Donald, OR (US)

(73) Assignee: Centure Applications LTD, Tel Aviv-Jaffa (IL)

( * ) Notice: Subject to any disclaimer, the term of this patent is extended or adjusted under 35 U.S.C. 154(b) by 325 days.

(21) Appl. No.: 18/451,471

(22) Filed: Aug. 17, 2023

(65) Prior Publication Data

US 2024/0268366 A1 Aug. 15, 2024

Related U.S. Application Data

(60) Provisional application No. 63/485,098, filed on Feb. 15, 2023.

(51) Int. Cl.
*A01M 7/00* (2006.01)
*G06V 20/56* (2022.01)

(52) U.S. Cl.
CPC .......... *A01M 7/0071* (2013.01); *A01M 7/006* (2013.01); *G06V 20/56* (2022.01)

(58) Field of Classification Search
CPC .. A01M 7/0071; A01M 7/006; A01M 7/0042; A01M 7/0089; G06V 20/56
See application file for complete search history.

(56) References Cited

U.S. PATENT DOCUMENTS

| | | | |
|---|---|---|---|
| 9,148,995 | B2 | 10/2015 | Hrnicek et al. |
| 10,255,670 | B1 | 4/2019 | Wu et al. |
| 11,393,049 | B2 | 7/2022 | Khait et al. |

(Continued)

FOREIGN PATENT DOCUMENTS

| | | | | |
|---|---|---|---|---|
| CA | 3050364 A1 * | 8/2018 | .......... | A01M 7/0089 |
| WO | WO-2013092272 A1 * | 6/2013 | .......... | A01M 7/0071 |

(Continued)

OTHER PUBLICATIONS

Booker, "Technology Targets Spray Control", WEEDit, Blog, 4P., Mar. 22, 2018.

(Continued)

*Primary Examiner* — Steven M Sutherland
(74) *Attorney, Agent, or Firm* — Intrinsic Law Corp.

(57) ABSTRACT

A configurable spray boom includes a boom frame that includes an upper support and a lower support that are separated from each other with respect to a vertical axis and extend parallel to a first axis. Camera frames are attached to the upper and lower supports, each camera frame including first and second supports that are separated from each other with respect to a second axis. Each camera frame has a vertical plane of symmetry. The camera frames are evenly spaced, with respect to the first axis, along the boom frame. In a first configuration a respective camera is mounted on the first support such that the respective camera is oriented in a first direction. In a second configuration the respective camera is mounted on the second support such that the respective camera is oriented in a second direction.

20 Claims, 20 Drawing Sheets

(56) References Cited

U.S. PATENT DOCUMENTS

| | | | |
|---|---|---|---|
| 2012/0237083 A1 | 9/2012 | Lange et al. | |
| 2018/0330166 A1 | 11/2018 | Redden et al. | |
| 2019/0064363 A1 | 2/2019 | Redden et al. | |
| 2019/0124827 A1 | 5/2019 | Davis et al. | |
| 2019/0239502 A1 | 8/2019 | Palomares et al. | |
| 2020/0011019 A1 | 1/2020 | Serrat et al. | |
| 2020/0214281 A1 | 7/2020 | Koch et al. | |
| 2022/0132829 A1* | 5/2022 | Kwak | A01C 23/047 239/11 |

FOREIGN PATENT DOCUMENTS

| | | |
|---|---|---|
| WO | 2020049576 A2 | 3/2020 |
| WO | 2022064482 A1 | 3/2022 |
| WO | 2022172274 A1 | 8/2022 |

OTHER PUBLICATIONS

Klein et al., "Nozzles—Selection and Sizing", Cooperative Extension, Institute of Agriculture and Natural Resources, University of Nebraska—Lincoln, EC141, p. 1-10, 2011.
Wolf, "Optical Spot Spraying and AI Scouting", Sprayers 101, 12 P., Feb. 8, 2019.
International Search Report for PCT Application No. PCT/IL2021/051133, dated Dec. 22, 2021.

* cited by examiner

CONFIGURABLE AGRICULTURAL SPRAY BOOM AND CONFIGURABLE DUAL SPRAYER SYSTEM

CROSS-REFERENCE TO RELATED APPLICATIONS

This application claims priority to U.S. Provisional Application No. 63/485,098, tiled "Agricultural Spray Boom," filed on Feb. 15, 2023, which is hereby incorporated by reference.

TECHNICAL FIELD

This application relates generally to systems for spraying an agricultural field.

BACKGROUND

Agricultural spray systems are often sold as single-tank broadcast spray systems. These systems apply a general herbicide across all areas of an agricultural field to prevent weed growth. While such systems are useful, they do not target specific weed growth.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a configurable spray boom comprising a boom frame extending along a first axis, the boom frame including an upper support and a lower support, the upper and lower supports separated from each other with respect to a vertical axis and extending parallel to the first axis, the first axis orthogonal to the vertical axis; a plurality of camera frames attached to the upper and lower supports, each camera frame including first and second supports that are separated from each other with respect to a second axis that is orthogonal to the first axis and to the vertical axis, each camera frame having a vertical plane of symmetry that is parallel to a plane defined by the second and vertical axes, the camera frames evenly spaced, with respect to the first axis, along the boom frame; and a plurality of cameras. In a first configuration a respective camera is mounted on the first support of each camera frame such that the respective camera is oriented in a first direction to capture images in the first direction. In a second configuration the respective camera is mounted on the second support of each camera frame such that the respective camera is oriented in a second direction to capture images in the second direction.

In one or more embodiments, the boom frame is symmetric with respect to a center of the boom. In one or more embodiments, a channel is defined in the lower support, the channel extending parallel to the first axis and along a length of the spray boom, and the spray boom further comprises a broadcast fluid line extending through the channel and parallel to the first axis; and a selective spot spray (SSP) line extending through the channel and parallel to the first axis.

In one or more embodiments, the spray boom further comprises a plurality of broadcast nozzles fluidly coupled to the broadcast fluid line, the broadcast nozzles adjustably spaced apart along the channel; and a plurality of SSP nozzles fluidly coupled to the SSP fluid line, the SSP nozzles spaced apart along the channel, whereby the broadcast nozzles and the SSP nozzles can be positioned at any location along the length of the spray boom without obstruction from the spray boom. In one or more embodiments, the spray boom further comprises a plurality of nozzle holders adjustably attached to the lower support, each nozzle holder attached to a respective SSP nozzle. In one or more embodiments, the channel is defined between first and second portions of the lower support.

In one or more embodiments, the boom frame includes first and second sides, each side including a plurality of sections, neighboring sections are pivotably coupled to each other at respective interfaces, the SSP nozzles are spaced apart along a length of the spray boom, a distance between neighboring SSP nozzles is less than a distance between neighboring sections of the boom frame, and the SSP nozzles are configured to be positionally offset from the respective interfaces.

In one or more embodiments, each camera has a respective field of view (FOV), and a spacing between neighboring camera frames is configured such that the respective FOVs of neighboring cameras at least partially overlap when the spray boom is in the first configuration and when the spray boom is in the second configuration to provide an overall FOV that is continuous. In one or more embodiments, the cameras are mounted at a predetermined angle when the spray boom is in the first configuration and when the spray boom is in the second configuration. In one or more embodiments, the spray boom further comprises a plurality of illumination sources mounted on the lower support, the illumination sources positioned between the neighboring camera frames to provide uniform lighting within the respective FOV of each camera. In one or more embodiments, the lower support includes first and second portions, the first and second portions defining a channel therebetween, when the spray boom is in the first configuration, the illumination sources are mounted on the second portion of the lower support such that the illumination sources are oriented in the first direction to illuminate the respective FOV in the first direction, and when the spray boom is in the second configuration, the illumination sources are mounted on the first portion of the lower support such that the illumination sources are oriented in the second direction to illuminate the respective FOV in the second direction.

In one or more embodiments, the spray boom further comprises a plurality of camera housings, each camera housing having an open cavity to receive the respective camera, the open cavity having an open end that is aligned with a field of view of the respective camera.

Another aspect of the invention is directed to a configurable dual sprayer system comprising an agricultural vehicle; a broadcast tank mounted on the agricultural vehicle, the broadcast tank holding one or more general-application liquid chemicals for preventing undesirable plants from growing in an agricultural field; a selective-spot spray (SSP) tank mounted on the agricultural vehicle, the SSP tank holding one or more specific liquid chemicals for treating one or more target weeds growing in the agricultural field; and a spray boom attached to the agricultural vehicle, the spray boom including a boom frame extending along a first axis, the boom frame including an upper support and a lower support, the upper and lower supports separated from each other with respect to a vertical axis and extending parallel to the first axis, the first axis orthogonal to the vertical axis; a plurality of camera frames attached to the upper and lower supports, each camera frame including first and second supports that are separated from each other with respect to a second axis that is orthogonal to the first axis and to the vertical axis, each camera frame having a vertical plane of symmetry that is parallel to a plane defined by the second and vertical axes, the camera frames evenly spaced, with respect to the first axis, along the boom frame; a plurality of cameras; a plurality of broadcast nozzles mounted on the boom frame, the broadcast nozzles fluidly coupled to the broadcast tank; and a plurality of SSP nozzles mounted on the boom frame, the SSP nozzles fluidly coupled to the SSP tank. In a first configuration a respective camera is mounted on the first support of each camera frame such that the respective camera is oriented in a first direction to capture images in the first direction. In a second configuration the respective camera is mounted on the second support of each camera frame such that the respective camera is oriented in a second direction to capture images in the second direction.

In one or more embodiments, in the first configuration, a first side of the spray boom is attached to a front of the agricultural vehicle, and in the second configuration, a second side of the spray boom is attached to a back of the agricultural vehicle. In one or more embodiments, a channel is defined in the lower support, the channel extending parallel to the first axis and along a length of the spray boom, and the spray boom further comprises a broadcast fluid line extending through the channel and parallel to the first axis, the broadcast fluid line fluidly coupled to the broadcast tank and to the broadcast nozzles; and an SSP fluid line extending through the channel and parallel to the first axis, the SSP fluid line fluidly coupled to the SSP tank and to the SSP nozzles.

In one or more embodiments, the broadcast nozzles are disposed in the channel and adjustably spaced apart along the channel, and the SSP nozzles are disposed in the channel and adjustably spaced apart along the channel, whereby the broadcast nozzles and the SSP nozzles can be positioned at any location along the length of the spray boom without obstruction from the spray boom. In one or more embodiments, the channel is defined between first and second portions of the lower support. In one or more embodiments, the system further comprises a first recirculation line fluidly coupled to the broadcast fluid line and to the broadcast tank; a second recirculation line fluidly coupled to the SSP fluid line and to the SSP tank, the first and second recirculation lines extending between the upper and lower supports of the boom frame, wherein the boom frame includes first and second sides, each side including a plurality of sections, neighboring sections are pivotably coupled to each other, and the first and second recirculation lines pass over the upper support of the boom frame between the neighboring sections.

In one or more embodiments, the system further comprises a plurality of air nozzles, each air nozzle configured to direct compressed air onto a respective camera lens of the respective camera; one or more compressed air lines fluidly coupled to the air nozzles; and a pressurized air tank mounted on the agricultural vehicle, the pressurized air tank fluidly coupled to the one or more compressed air lines. In one or more embodiments, the boom frame is symmetric with respect to a center of the boom.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

A configurable spray boom includes a boom frame having upper and lower supports that extend along a first axis. A plurality of evenly spaced camera frames are attached to the upper and lower supports. Each camera frame includes first and second supports that are separated from each other with respect to a second axis that is orthogonal to the first axis and to a vertical axis. Each camera frame has a vertical plane of symmetry. A respective camera can be mounted on the first or second support of each camera frame. In a first configuration the respective camera is mounted on the first support of each camera frame such that the respective camera is oriented in a first direction to capture images in the first direction. In a second configuration the respective camera is mounted on the second support of each camera frame such that the respective camera is oriented in a second direction to capture images in the second direction.

The lower support can include first and second portions that define a channel therebetween. A broadcast line, broadcast nozzles, a selective spot sprayer (SSP) line, and/or SSP nozzles can be located in the channel, which can allow the broadcast and SSP nozzles to be placed at any position without obstruction from the boom frame.

The boom frame is configured to be attached to the front or back of an agricultural vehicle, such as a tractor. A broadcast tank and an SSP tank can be mounted on the agricultural vehicle. The broadcast tank can be fluidly coupled to the broadcast line and the broadcast nozzles. The broadcast tank holds one or more general-application liquid chemicals for preventing undesirable plants from growing in an agricultural field. The SSP tank can be fluidly coupled to the SSP line and the SSP nozzles. The SSP tank holds one or more specific liquid chemicals for treating one or more target weeds growing in the agricultural field.

Figure 1:
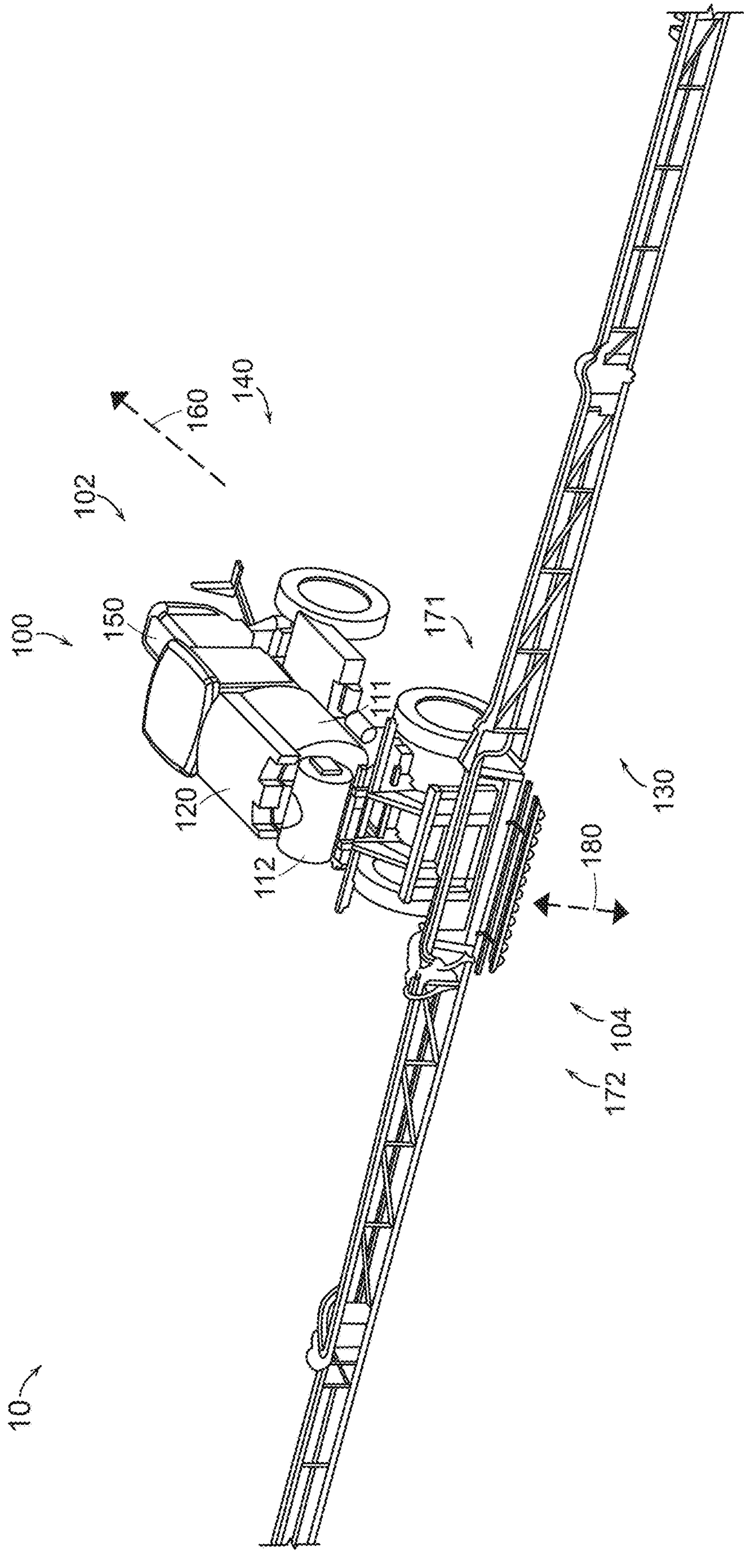
FIG. 1 is a side view of a dual sprayer system according to an embodiment.

FIG. 1 is an isometric view of a dual sprayer system 10 according to an embodiment. The system 10 includes an agricultural vehicle 100, a broadcast tank 111, an SSP tank 112, a rinse tank 120, and a spray boom 130.

The broadcast tank 111 is mounted on the agricultural vehicle 100 and can be an original-equipment manufacturer (OEM) tank and/or a primary tank for the agricultural vehicle 100. The agricultural vehicle 100, the broadcast tank 111, the rinse tank 120, pumps, and/or corresponding fluid lines can comprise an OEM broadcast spray system 140. Alternatively, the agricultural vehicle 100, the broadcast tank 111, the rinse tank 120, and/or the corresponding fluid lines can be aftermarket and/or retrofit components.

The broadcast tank 111 is configured to hold one or more general-application liquid chemicals (e.g., herbicides) to be sprayed broadly onto an agricultural field using the spray boom 130, which is attached (e.g., releasably attached) to the agricultural vehicle 100. The broadcast liquid chemicals are configured to prevent weeds and/or other undesirable plants from growing. One or more first fluid lines fluidly couple the broadcast tank 111 to broadcast nozzles on the spray boom 130.

The SSP tank 112 is mounted on the agricultural vehicle 100 such as on a frame attached to the agricultural vehicle 100. The SSP tank 112 can be an aftermarket tank that is retrofit onto the agricultural vehicle 100. Alternatively, the SSP tank 112 can be an OEM SSP tank. The SSP tank 112 is configured to hold one or more target-application or specific chemical(s) (e.g., herbicide(s)) that is/are designed to target one or more weeds growing in the agricultural field. One or more second fluid lines fluidly couple the SSP tank to SSP nozzles on the spray boom 130. The specific chemical(s) in the SSP tank 112 are selectively sprayed using the SSP nozzles in response to imaging of the agricultural field and analysis/detection by one or more trained machine learning models or image processing algorithms. Valves coupled to the SSP nozzles can be opened and closed to selectively spray the detected weeds.

The rinse tank 120 is fluidly coupled to the broadcast tank 111 and to the SSP tank 112. Water and/or another liquid stored in the rinse tank 120 can be used to rinse the broadcast tank 111 and the SSP tank 112 after each tank 111, 112 is emptied.

The selective application of the specific chemical(s) stored in the SSP tank 112 allows the volumetric capacity of the SSP tank 112 to be smaller than the volumetric capacity of the broadcast tank 111. In one example, the volumetric capacity of the broadcast tank 111 can be at least about 3 times greater than the volumetric capacity of the SSP tank 112. For example, the volumetric capacity of the broadcast tank 111 can be about 3 to about 20 times, including about 5 times, about 10 times, about 15 times, and any value or range between any two of the foregoing values, greater than the volumetric capacity of the SSP tank 112. Conversely, the volumetric capacity of the SSP tank 112 can be less than or equal to about 30% the volumetric capacity of the broadcast tank 111. For example, the volumetric capacity of the SSP tank 112 can be about 5% to about 30%, including about 10%, about 15%, about 20%, about 25%, and any value or range between any two of the foregoing values, lower than the volumetric capacity of the broadcast tank 111.

The relative sizes (volumetric capacities) of the broadcast tank 111 and the SSP tank 112 can be configured such that, on average, each tank 111, 112 will be emptied (from a respective full tank) at approximately the same time. For example, the respective chemicals stored in each tank 111, 112 can be used, on average, at the same relative volumetric rate compared to the respective size of the tank 111, 112. This allows the refilling of tanks 111, 112 to be synchronized which can improve efficiency.

The engine 150 for the agricultural vehicle 100 can be replaced with a motor when the agricultural vehicle 100 is electric or can include both an engine and a motor when the agricultural vehicle 100 is a hybrid vehicle. In any case, the agricultural vehicle 100 includes a mechanical drive system that powers the agricultural vehicle 100 and the wheels.

Figure 2:
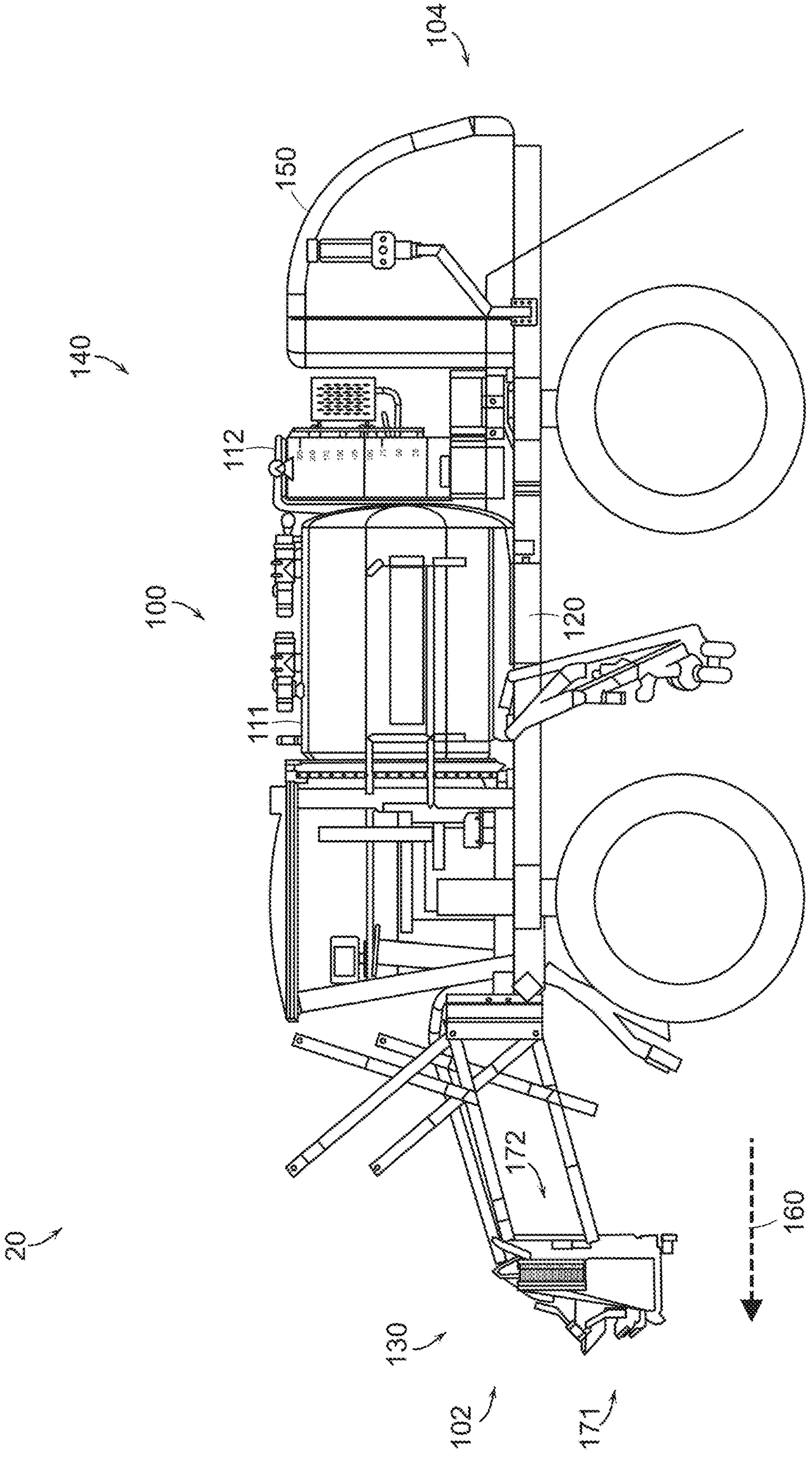
FIG. 2 is a side view of a dual sprayer system according to another embodiment.

The spray boom 130 is attached to the back 104 of the agricultural vehicle 100 in a first configuration of the system 10 such that the agricultural vehicle 100 pulls the spray boom 130 as the agricultural vehicle 100 drives forward (e.g., in direction 160). In a second configuration of the system 10, the spray boom 130 can be attached to the front 102 of the agricultural vehicle 100 such that the agricultural vehicle 100 pushes the spray boom 130 as the agricultural vehicle 100 drives forward. An example of the second configuration is illustrated in FIG. 2, which is a side view of a dual sprayer system 20 according to another embodiment. System 20 is the same as system 10 except for the locations of the broadcast tank 111, the SSP tank 112, and the rinse tank 120 and the configuration/location of the spray boom 130.

To transition between the first and second configurations, the spray boom 130 is rotated by 180 degrees about a vertical axis 180 that passes through the center of the spray boom 130. The vertical axis 180 can represent an axis of symmetry of the spray boom 130. In the first configuration, a first side 171 of the spray boom 130 is attached to the back 104 of the agricultural vehicle 100, as illustrated in FIG. 1. In the second configuration, a second side 172 of the spray boom 130 is attached to the front 102 of the agricultural vehicle 100, as illustrated in FIG. 2. Rotating the spray boom 130 by 180 degrees allows the spray boom 130 to be folded inwardly towards the agricultural vehicle 100 in both configurations.

Figure 3:
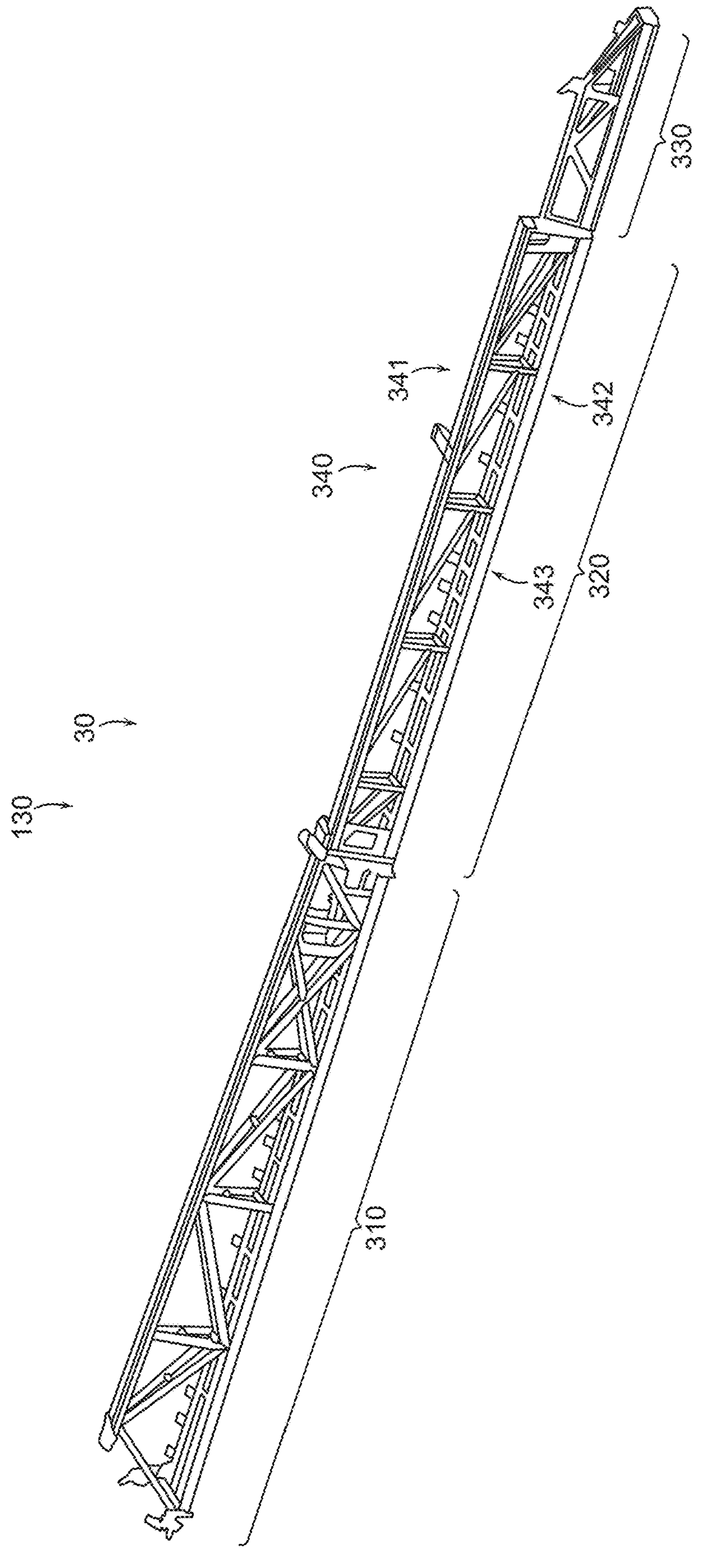
FIG. 3 is an isometric view of a side of the spray boom illustrated in FIGS. 1 and 2.

FIG. 3 is an isometric view of a side 30 of the spray boom 130. The side 30 can represent the right-hand side and/or the left-hand-side of the spray boom 130. The left- and right-hand sides of the spray boom 130 are preferably the same such that the spray boom 130 is symmetric with respect to the center of the spray boom 130.

The side 30 includes a main section 310, a middle section 320, and a breakaway section 330. In other embodiments, each side 30 includes only one section (e.g., main section 310) or only two sections (e.g., main section 310 and middle section 320 or breakaway section 330). The main section 310 is configured to be attached to an agricultural vehicle such as agricultural vehicle 100 (FIGS. 1, 2). The breakaway section 330 is configured to pivot with respect to the middle section 320 when a force is applied to the breakaway section 330. For example, when the breakaway section 330 is accidently pushed into an object (e.g., a bush, a rock, etc.) on an agricultural field, the breakaway section 330 pivots to prevent damage to the breakaway section 330 and/or another section of the spray boom 130. The spray boom 130 can comprise aluminum and/or mild steel. Examples of aluminum include 5052 aluminum and/or 6061 aluminum. Certain portions of the spray boom 130 can comprise high-strength steel, such as the pivot rod ends.

Each section 310, 320, 330 includes a respective boom frame 340 that includes an upper support 341 and a lower support 342. Angled cross supports 343 can be attached to the upper and lower supports 341, 342 to increase the mechanical strength of each boom frame 340.

Figure 4A:
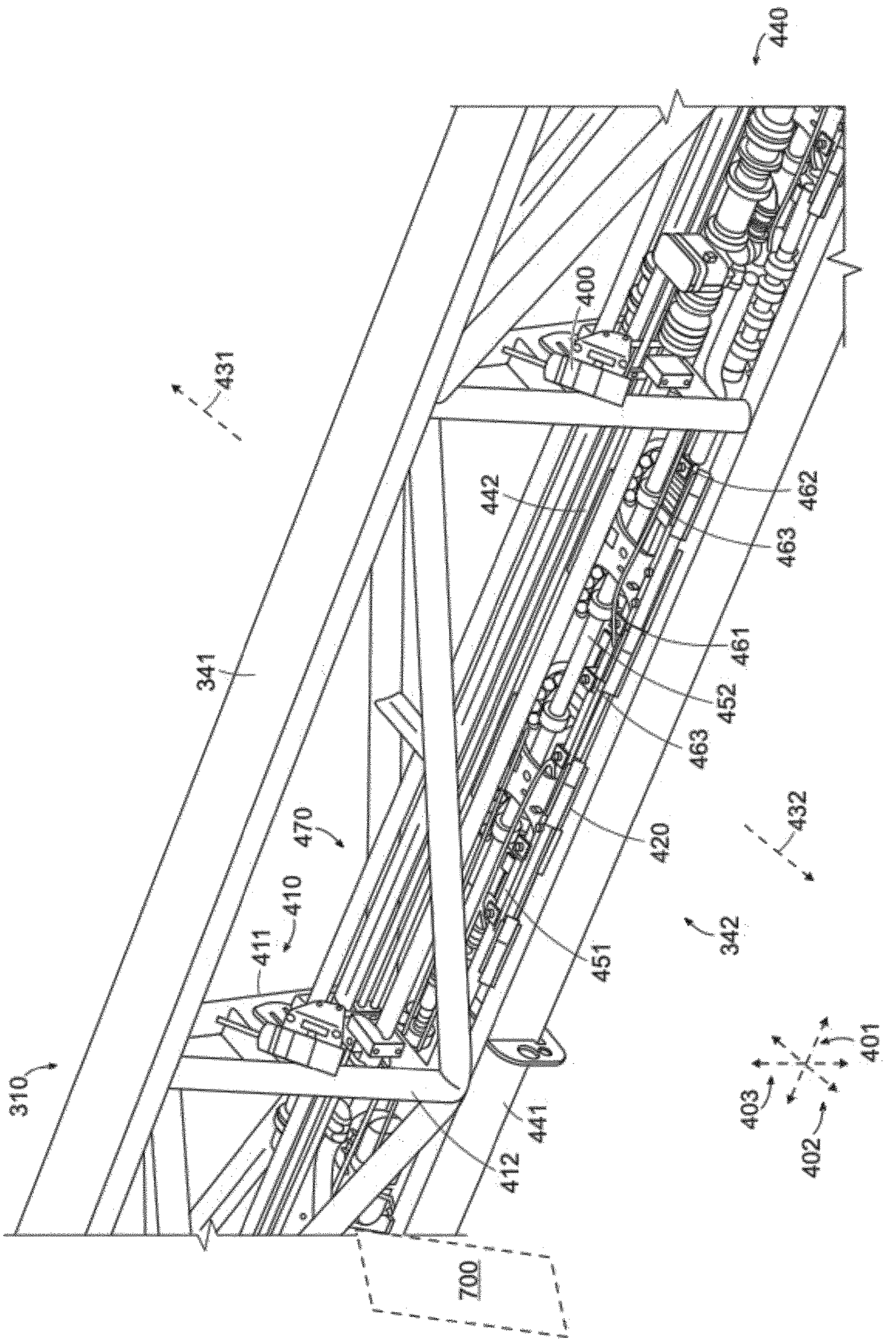
FIG. 4A is an enlarged isometric view of the main section of the spray boom.

FIG. 4A is an enlarged isometric view of the main section 310 of the spray boom 130.

Multiple cameras 400 or other image sensors are mounted on the main section 310. Each camera 400 is mounted on and/or attached to a respective camera frame 410. The camera frames 410 and cameras 400 are spaced apart along and/or with respect to a first axis 401. The camera frames 410 and cameras 400 are designed to be evenly spaced apart along and/or with respect to the first axis 401. The spacing of the camera frames 410 can be configured such that the fields of view of the cameras 400 are aligned (e.g., along an axis) and partially overlap so that a region of the agricultural field in front of the spray boom 130 is fully imaged.

Each camera frame 410 includes first and second posts 411, 412. The first and second posts 411, 412 extend between and are mechanically coupled to the upper support 341 and the lower support 342. The first and second posts 411, 412 for each camera frame 410 are spaced apart along and/or with respect to a second axis 402 that is orthogonal to the first axis 401. The second axis 402 is parallel to the direction 160 (FIGS. 1, 2). In addition, the first and second axes 401, 402 are orthogonal to a third axis 403 which can alternately be referred to as a vertical axis. The first post 411 is attached to a first portion 441 (e.g., a first plate or rail) of the lower support 342. The second post 412 is attached to a second portion 442 (e.g., a second plate or rail) of the lower support 342.

In the first configuration, each camera 400 is mounted and/or attached to the first post 411 of a respective camera frame 410 such that the cameras 400 are oriented to capture images in a second direction 432 (e.g., parallel to second axis 402 and to direction 160 (FIGS. 1, 2)). In the second configuration, each camera 400 is mounted and/or attached to the second post 412 of the respective camera frame 410 such that the cameras 400 are oriented to capture images in a first direction 431 (e.g., relative to the second axis 402) that is opposite to the second direction 432. The first and second configurations are further illustrated in FIGS. 7A and 7B, respectively. The first configuration may be useful when the spray boom 130 is pushed by the agricultural vehicle 100 (e.g., as illustrated in FIG. 2). The second configuration may be useful when the spray boom 130 is pulled by the agricultural vehicle 100 (e.g., as illustrated in FIG. 1). The cameras 400 are configured to be mounted at a predetermined angle relative to axis 403.

Multiple illumination sources 420 are mounted on the lower support 342. The illumination sources 420 are preferably positioned between neighboring cameras 400 and/or between neighboring camera frames 410. The illumination sources 420 can provide broad-spectrum or narrow-spectrum light. The illumination sources 420 are configured to provide uniform (or substantially uniform) lighting within the field of view of the cameras 400. The illumination sources 420 can be evenly spaced along the length of the spray boom 130. The illumination sources 420 can comprise light-emitting diodes (LEDs), light pipes (e.g., optical fibers optically coupled to LEDs or other lights), lasers, incandescent lights, and/or other lights.

In the first configuration, each illumination source 420 is mounted on the second portion 442 of the lower support 342 such that the illumination sources 420 produce light in the second direction 432. In the second configuration, each illumination source 420 is mounted on the first portion 441 of the lower support 342 such that the illumination sources 420 produce light in the first direction 431.

The cameras 400 and illumination sources 420 are mounted between the upper and lower supports 341, 342 to physically protect the cameras 400 and illumination sources 420 from striking objects.

A channel 440 is defined between the first and second portions 441, 442 of the lower support 342. The channel 440 has a width that can be measured with respect to the second axis 402. The channel 440 extends along the first axis 401.

A broadcast fluid line 451 and broadcast nozzles 461 are located in the channel 440. The broadcast liquid chemical(s) in the broadcast tank 111 flow through the broadcast fluid line 451 to the broadcast nozzles 461 where the broadcast liquid chemical(s) is/are sprayed onto the agricultural field. The broadcast nozzles 461 can be spaced evenly along the spray boom 130. For example, broadcast nozzles 461 can be spaced in the range of about 25 cm to about 40 cm, including about 30 cm, about 35 cm, and any value or range between any two of the foregoing values, from neighboring broadcast nozzles 461. The spacing between neighboring broadcast nozzles 461 can be equal to and/or can correspond to the distance between planting rows in the agricultural field.

An SSP fluid line 452 and SSP nozzles 462 are located in the channel 440. The specific chemical(s) in the SSP tank 112 in the SSP tank 112 flow through the SSP fluid line 451 to the SSP nozzles 462 where the specific liquid chemical(s) is/are selectively spot sprayed onto detected weeds in the agricultural field. The SSP nozzles 462 can be mounted on nozzle holders 463, which are releasably attached to the spray boom 130 such as by fasteners, brackets, clamps, and/or with other attachments. The SSP nozzles 462 are positioned along the first axis 401 at positions relative to the field of view (FOV) of each camera 400 such that one or more SSP nozzles 462 can be activated in response to the detection of weeds by the camera 400 and according to the position of the weeds within the FOV of the camera 400.

An advantage of placing the broadcast and SSP nozzles 461, 462 in the channel 440 is that they can be placed at any position, location, and/or spacing along the spray boom 130 without obstruction from the frame 340 of any section of the spray boom 130. Since the channel 440 extends along the first axis 401, the SSP nozzles 462 are aligned with respect to each other along the first axis 401. Similarly, the broadcast nozzles 461 are aligned with respect to each other along the first axis 401.

The broadcast and SSP nozzles 461, 462 can be located at the same height (e.g., vertical position) along the spray boom 130.

One or more fluid recirculation lines 470 can be fluidly coupled to the broadcast fluid line 451 and/or to the SSP fluid line 452. For example, one fluid recirculation line 470 can be fluidly coupled to the broadcast fluid line 451 and to the broadcast tank 111 to provide a first fluid loop. Another recirculation line 470 can be fluidly coupled to the SSP fluid line 452 and to the SSP tank 112 to provide a second fluid loop. The recirculation lines 470 can be located between the upper and lower supports 341, 342.

The middle section 320 and/or the breakaway section 330 can include some or all of the same features as discussed with respect to the main section 310.

Figure 4B:
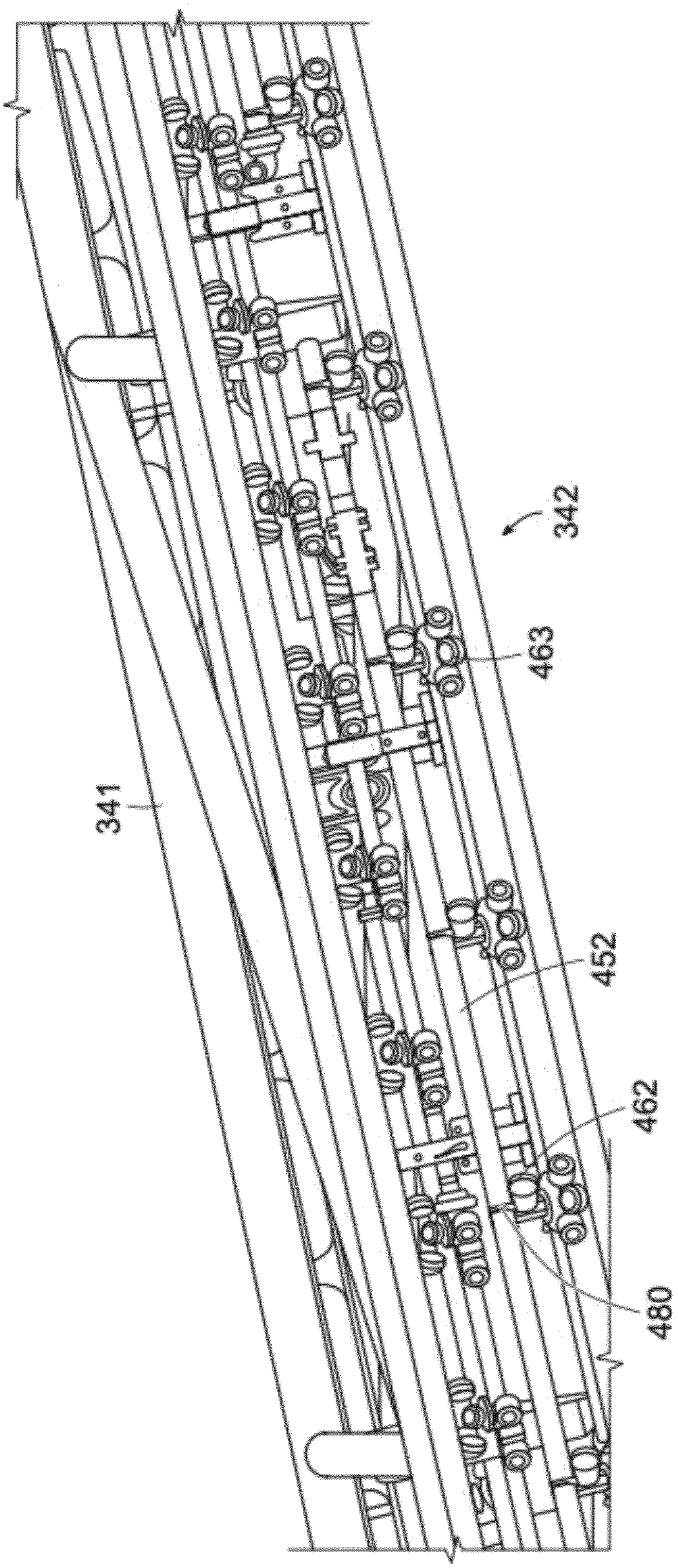
FIG. 4B is an isometric view of the spray boom according to an embodiment.

FIG. 4B is an isometric view of the spray boom 130 that further illustrates the nozzle holders 463 according to an embodiment. Each nozzle holder 463 can include a ring 480 that clamps or secures the SSP fluid line 452. The SSP nozzle 462 and SSP fluid line 452 are fluidly connected in the hole of the ring 480. The SSP nozzle 462 can be attached to the ring 480. Nozzle holders 463 can also be used to secure and fluidly couple the broadcast line 451 to the broadcast nozzles 462.

Figure 5:
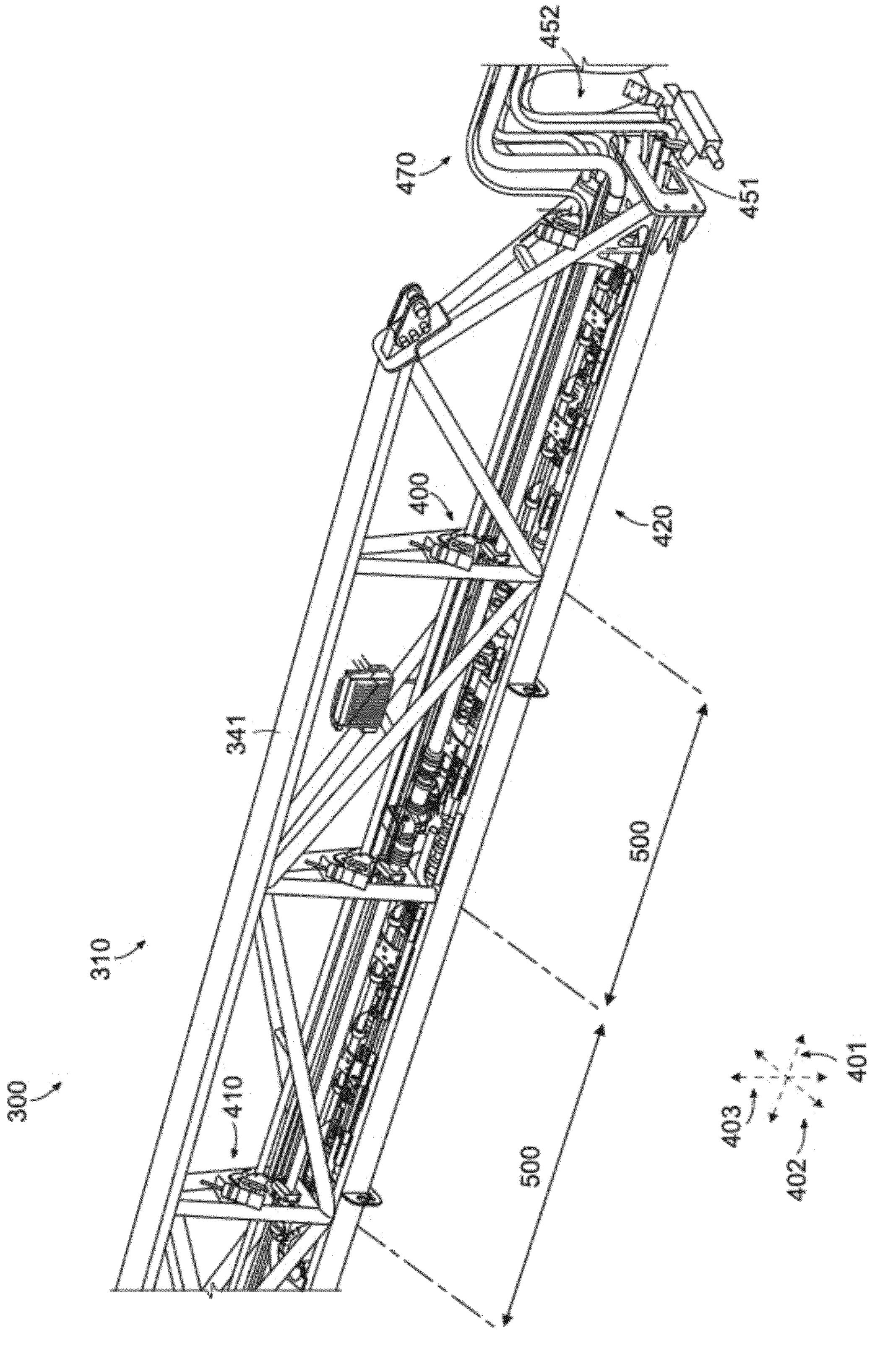
FIG. 5 is another isometric view of the main section of the spray boom.

FIG. 5 is another isometric view of the main section 310 of the spray boom 130 to further illustrate the configuration of camera frames 410 and cameras 400 according to an embodiment. The camera frames 410 and cameras 400 are evenly spaced along or parallel to the first axis 401 such that the distance 500 between neighboring cameras 400 is equal. The illumination sources 420 can be individually mounted on the frame 340 of the spray boom 130.

The spacing between the illumination sources 420 is designed to be flexible/adjustable. All the mounting mechanical kits for the cameras 400 are preferably the same. In addition, all the mounting mechanical kits for the illumination sources 420 are preferably the same.

Figure 6:
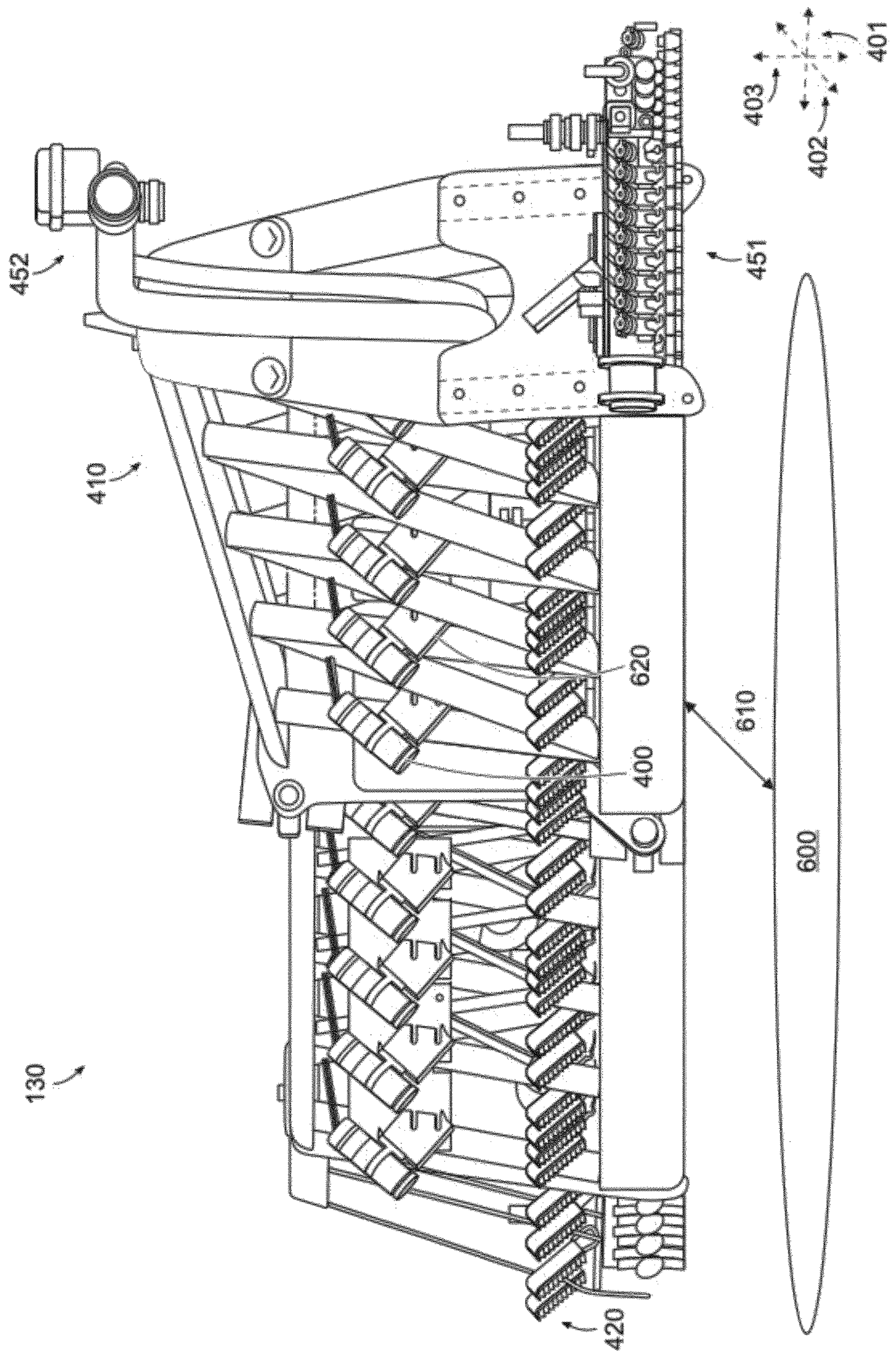
FIG. 6 is an end view of the spray boom.

FIG. 6 is an end view of the spray boom 130. The distance between neighboring camera frames 410 and respective cameras 400 (e.g., as measured with respect to axis 401) can be optimized according to the predetermined angle of the cameras 400 (e.g., relative to axis 403) and the FOVs of the cameras 400 such that an overall FOV 600 of the cameras 400 is continuous at a predetermined distance 610 from the spray boom 130, the distance 610 measured along or with respect to the second axis 402.

A housing 620 can be mounted or attached to some or each camera frame(s) 410. The housing 620 is configured to protect one or more electrical components located in the housing 620. The electrical components can include one or more processors, computer memory (e.g., storing trained machine-learning models), power supplies, analog-to-digital converters, digital-to-analog converters, amplifiers, and/or other electrical components. The electrical components in the housing 620 are in electrical communication and/or electrically coupled to one or more cameras 400 and one or more illumination sources 420.

Figure 7B:
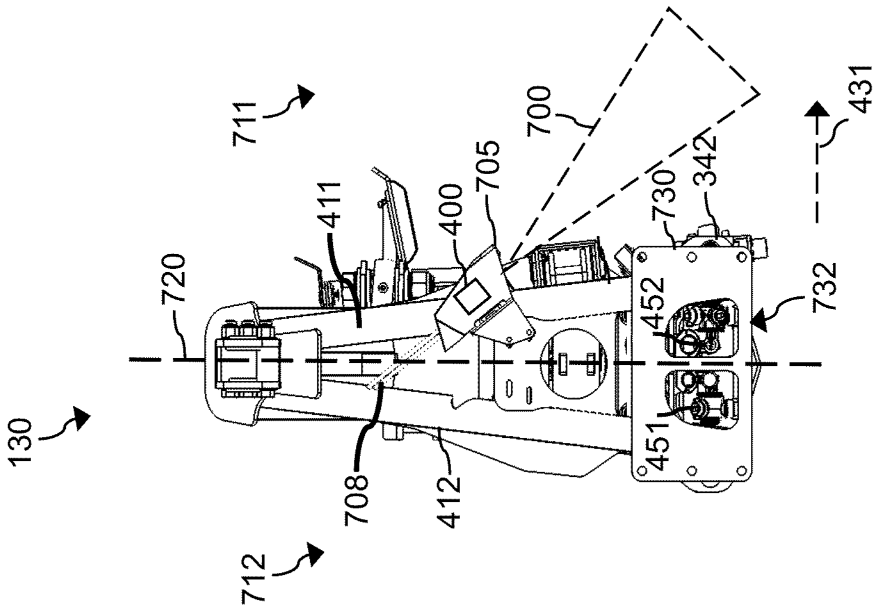
FIGS. 7A and 7B are cross-sectional views of the spray boom.
Figure 7A:
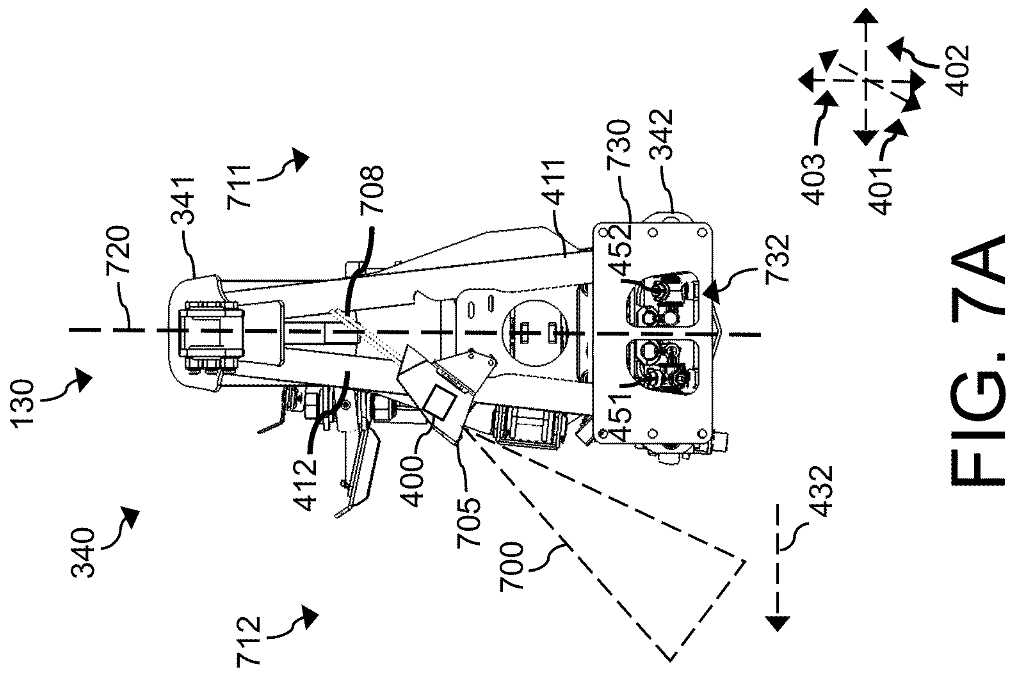

FIGS. 7A and 7B are cross-sectional views of the spray boom 130, taken through plane 700 in FIG. 4, to further illustrate the first and second configurations, respectively. In FIG. 7A, the camera 400 is attached to the first post 411 of the camera frame 410. The camera 400 is oriented such that its FOV 700 is directed in front of a second side 712 of the spray boom 130. The second side 712 of the spray boom 130 is closer to the second post 412 than to the first post 411.

In FIG. 7B, the camera 400 is attached to the second post 412 of the camera frame 410. The camera 400 is oriented such that its FOV 700 is directed in front of a first side 711 of the spray boom 130. The first side 711 of the spray boom 130 is closer to the first post 411 than to the second post 412.

The camera 400 can be covered and/or mounted within a camera housing 705. The camera housings 705 can protect the cameras 400 from impacts with objects and from the rain. The camera housing 705 can be attached to the first or second post 411, 412 by a post or rod 708.

The camera frame 410 is symmetric with respect to a vertical plane 720 that is parallel to the plane defined by the first and third axes 401, 403. This symmetry allows the configuration and orientation of the cameras 400 to be switched between the first and second configurations while maintaining the same alignment and overlap of FOVs 700.

FIGS. 7A and 7B also illustrate that the first and second posts 411, 412 can be attached to a support plate 730 in the lower support 342 of the frame 340. The support plate includes one or more holes 732 that allow the channel 440, including the broadcast and SSP fluid lines 451, 452, to extend through the hole(s) 732.

Figure 8:
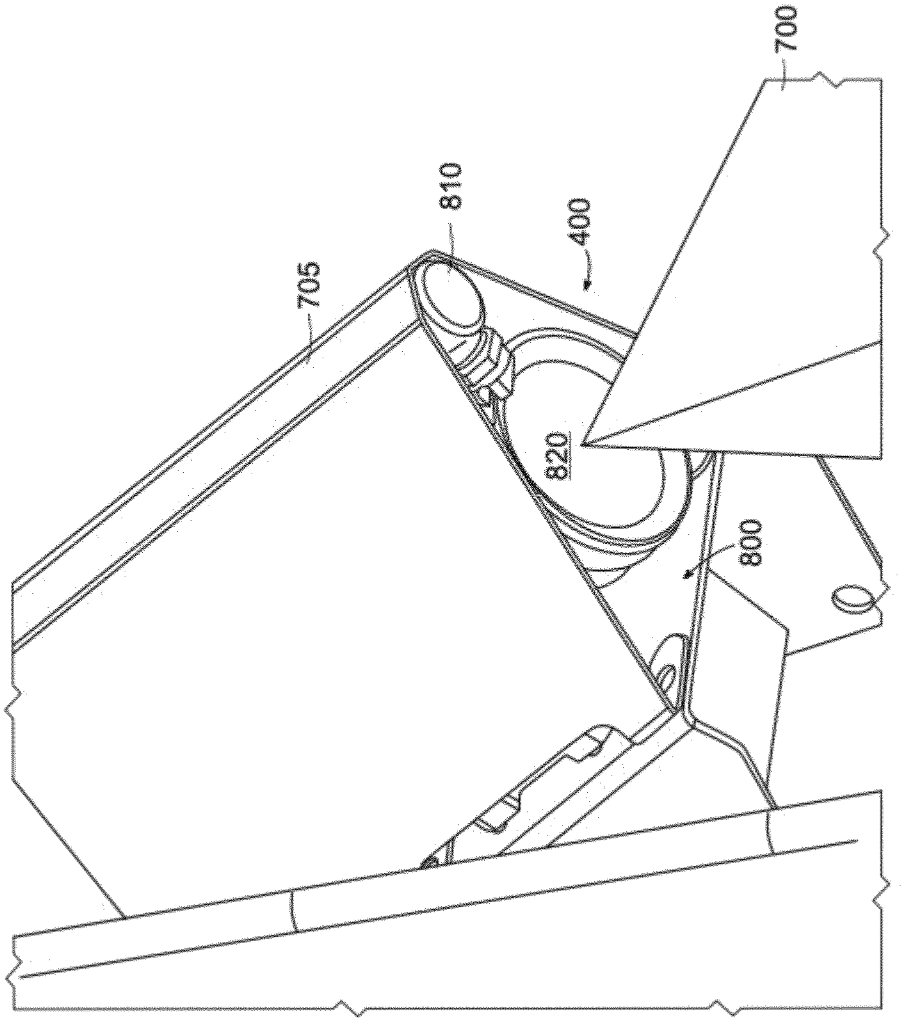
FIG. 8 is a detailed isometric view of the camera housing according to an embodiment.

FIG. 8 is a detailed isometric view of the camera housing 705 according to an embodiment. The camera housing 705 has cavity 800 that is open at one end. The cavity 800 is configured to receive the camera 400. The open end of the cavity 800 is aligned with the orientation of the camera 400 and its FOV 700 such that the camera housing 705 protects but does not obstruct the camera 400.

An optional air nozzle 810 is aligned with respect to the camera 400 (e.g., with respect to the camera lens 820) to direct air in front of the camera 400 to prevent dust, particles, fertilizer, and/or chemicals or liquids from accumulating on the camera lens 820, which can block the camera lens and degrade the quality of images acquired by the camera 400. The volume and/or direction of the air produced by the air nozzle 810 can be varied according to the weather conditions.

Figure 9:
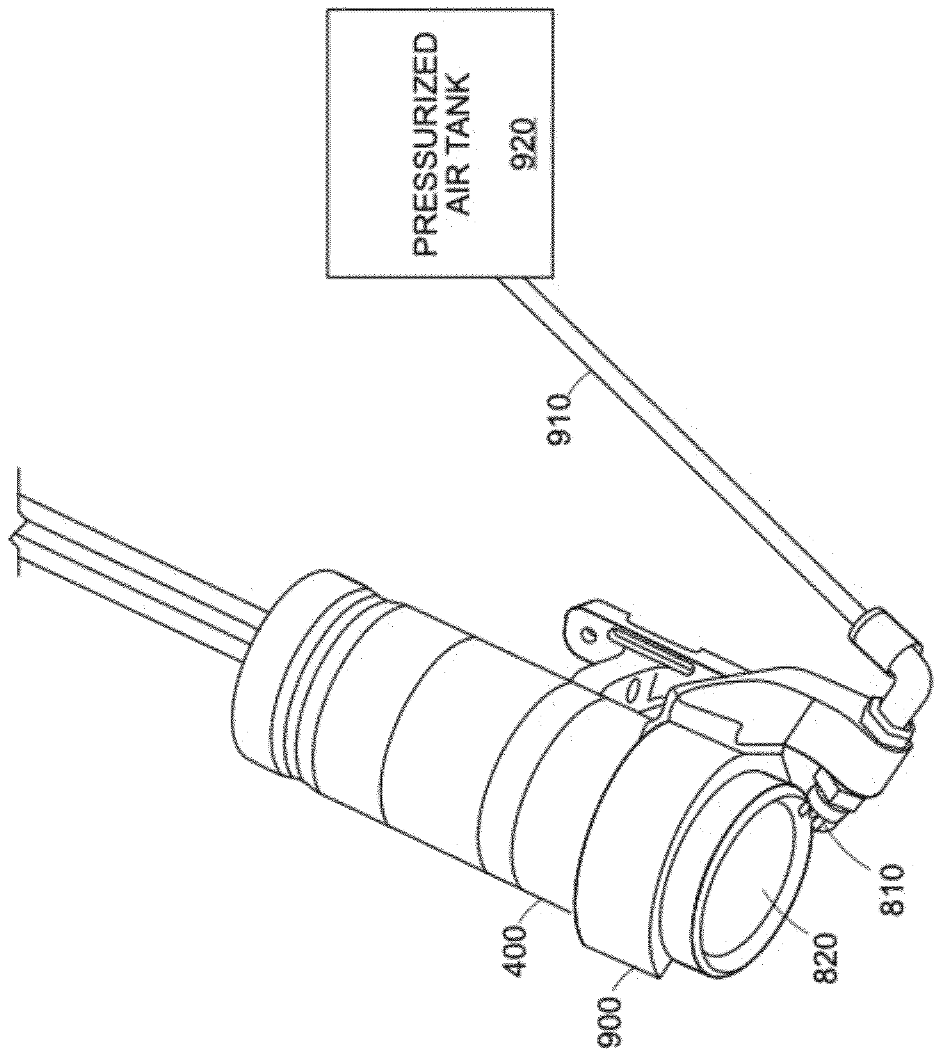
FIG. 9 illustrates the camera and optional air nozzle according to another embodiment.

FIG. 9 illustrates the camera 400 and optional air nozzle 810 according to another embodiment where the air nozzle 810 is configured to direct compressed air onto the camera lens 820 to blow debris, such as dust, particles, fertilizer, and/or chemicals or liquids, from the surface of the camera lens 820. The air nozzle 810 can be supported by a strap 900 that is attached to the camera 400.

The air nozzle 810 is attached and fluidly coupled to a compressed air line 910. The compressed air line 910 provides clean air from a pressurized air tank 920 that can be mounted on the agricultural vehicle 100. The air in the compressed air line 910 can pass through a pressure regulator, a filter, an air/liquid separator, and/or a dryer system between the pressurized air tank 920 and the air nozzle 810. The compressed air can also be used for a sprayer air cushion system (e.g., between the wheels and the sprayer to prevent bumping) and/or other sprayer needs. Pressurized air can also be used to clean or purge the fluid lines (e.g., SSP and/or broadcast fluid lines).

Figure 10:
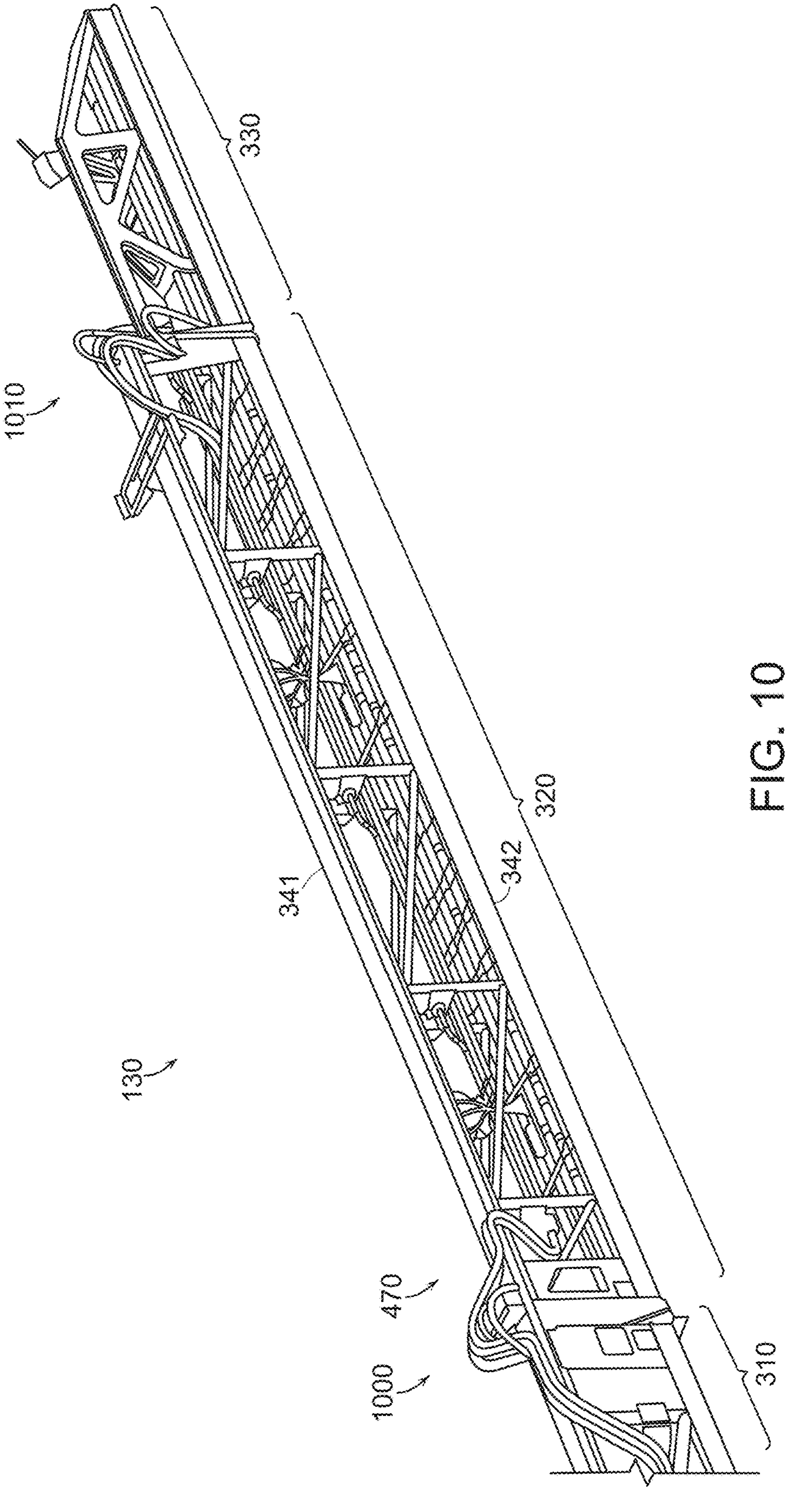
FIG. 10 is an isometric view of the spray boom.

FIG. 10 is an isometric view of the spray boom 130. This view illustrates that the recirculation lines 470 pass over the upper support 341 of the boom frame 340 at the interface 1000 between the main section 310 and the middle section 320 and at the interface 1010 between the middle section 320 and the breakaway section 330. Additional length of recirculation lines 470 are located at the interfaces 1000, 1010 to allow the spray boom 130 to fold at the interfaces 1000, 1010.

Figure 11:
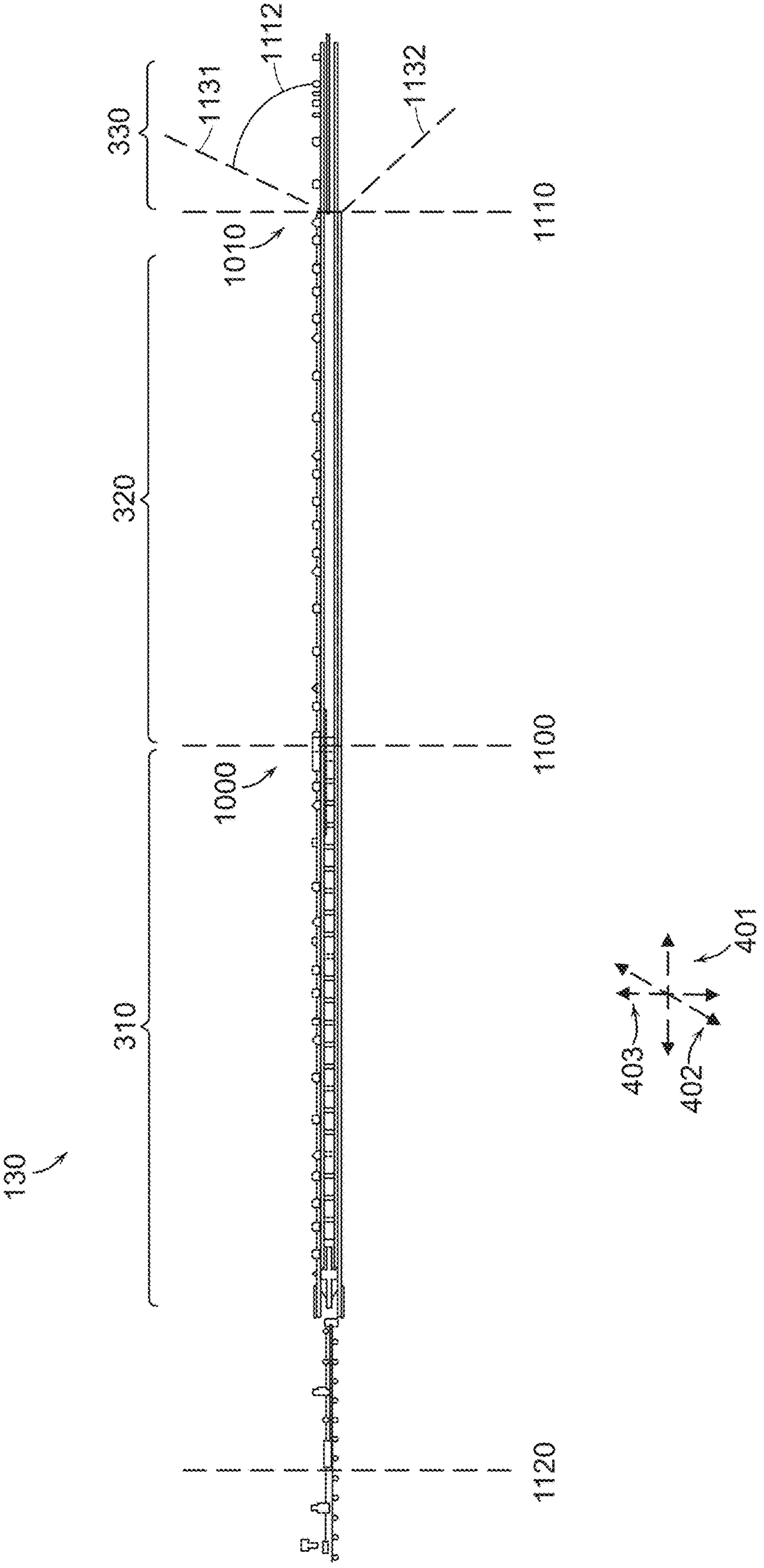
FIG. 11 is a top view of the spray boom.

FIG. 11 is a top view of the spray boom 130. This view illustrates that the spray boom 130 includes a folding plane 1100 and a breakaway plane 1110. The folding plane 1100 passes through the interface 1000. The breakaway plane 1110 passes through the interface 1010. Each plane 1100, 1110 is parallel to each other and to the plane defined by the second and third axes 402, 403.

The folding plane 1100 can be located about 20 feet to about 40 feet from the boom center line/plane 1120, including about 25 feet, about 30 feet, about 35 feet, and any value or range between any two of the foregoing distances, as measured with respect to the first axis 401. The boom folding plane 1100 can allow the main section 310 and middle section 320 to fold approximately in half for storage and placed along the side of the agricultural vehicle 100 (e.g., tractor) such that the folded spray boom 130 extends parallel to the direction of travel of the agricultural vehicle 100.

The boom center line 1020 represents an axis of symmetry of the spray boom 130. Only one side/half of the spray boom 130 is illustrated in FIG. 10. The spray boom 130 can be attached to the agricultural vehicle 100 at or near the boom center line 1020.

The breakaway section 330 of the spray boom 300 is pivotably coupled to the middle section 320 at the breakaway plane 1110. The breakaway plane 1110 can be located 50 feet to about 70 feet from the boom center line 1120, including about 55 feet, about 60 feet, about 65 feet, and/or any value or range between any two of the foregoing distances, as measured with respect to the first axis 401. The breakaway section 330 is configured to pivot (e.g., diagonally upwards) to form a pivot angle 1112 of about 45 degrees to about 75 degrees with respect to the middle section 320, which extends parallel to axis 401, including about 50 degrees, about 55 degrees, about 60 degrees, about 65 degrees, about 70 degrees, and any value or range between any two of the foregoing angles. The pivot angle 1112 can be formed when the breakaway section 330 is pivoted forwards 1131 (and optionally diagonally upwards) or backwards 1132 (and optionally diagonally upwards). As such, the breakaway section 330 can pivot over a total angular range that is twice pivot angle 1112, for example about 90 degrees to about 150 degrees, including about 100 degrees, about 110 degrees, about 120 degrees, about 130 degrees, about 140 degrees, and any value or range between any two of the foregoing angles. In some embodiments, the breakaway section 330 can be configured to pivot upwards such (e.g., to form a pivot angle 1012) in addition to pivoting forwards and backwards. The breakaway section 330 can pivot when the breakaway section 330 bumps into or pushed into an obstacle.

Figure 12:
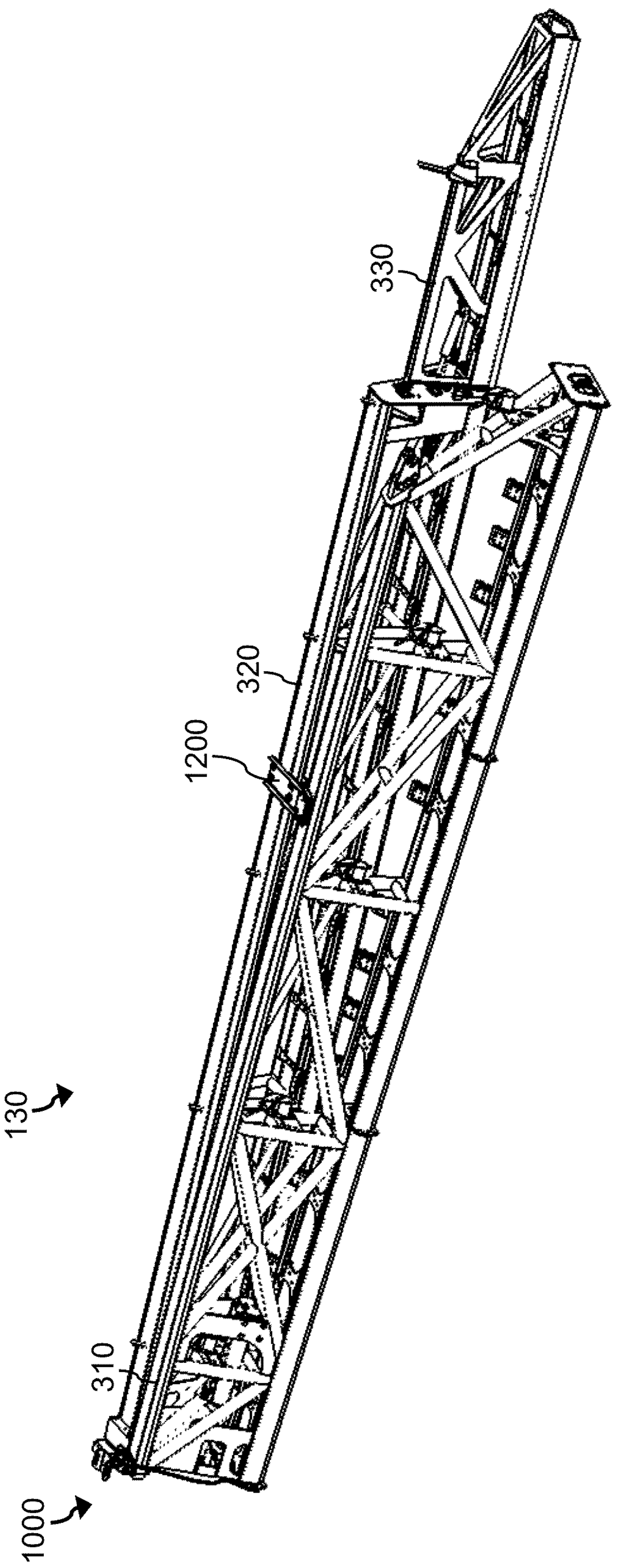
FIG. 12 is an isometric view of the spray boom in a folded configuration.

FIG. 12 is an isometric view of the spray boom 130 in a folded configuration. In the folded configuration, the main section 310 and the middle section 320 are folded at interface 1000 to decrease the length of the spray boom 130 such as for storage or maneuvering close to objects.

A support bracket 1200 can be attached to the main section 310 and the middle section 320 to mechanically support and/or mechanically secure each side of the spray boom 130 in the folded configuration.

Figure 13:
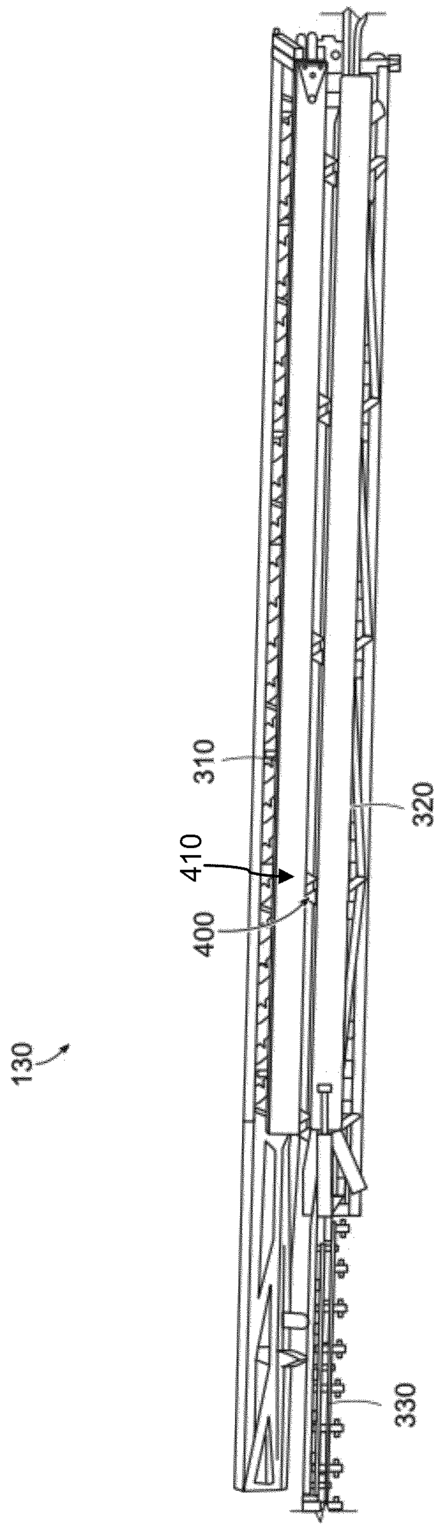
FIG. 13 is a top view of the spray boom in the folded configuration.

FIG. 13 is a top view of the spray boom 130 in the folded configuration. The cameras 400 and camera frames 410 are positionally offset when the spray boom 130 in the folded configuration so that the corresponding cameras 400 do not strike one another. In addition, the cameras 400 are oriented inwards to protect the cameras 400 from striking other objects. For example, the cameras 400 are located between the main section 310 and the middle section 320 and between the main section 310 and the breakaway part 330 of the spray boom 130. The middle section 320 is folded away from the agricultural vehicle 100 regardless of whether the spray boom 130 is attached to the front or back of the agricultural vehicle 100 (e.g., since the spray boom 130 is rotated by 180 degrees to transition between the first and second configurations).

Figure 14A:
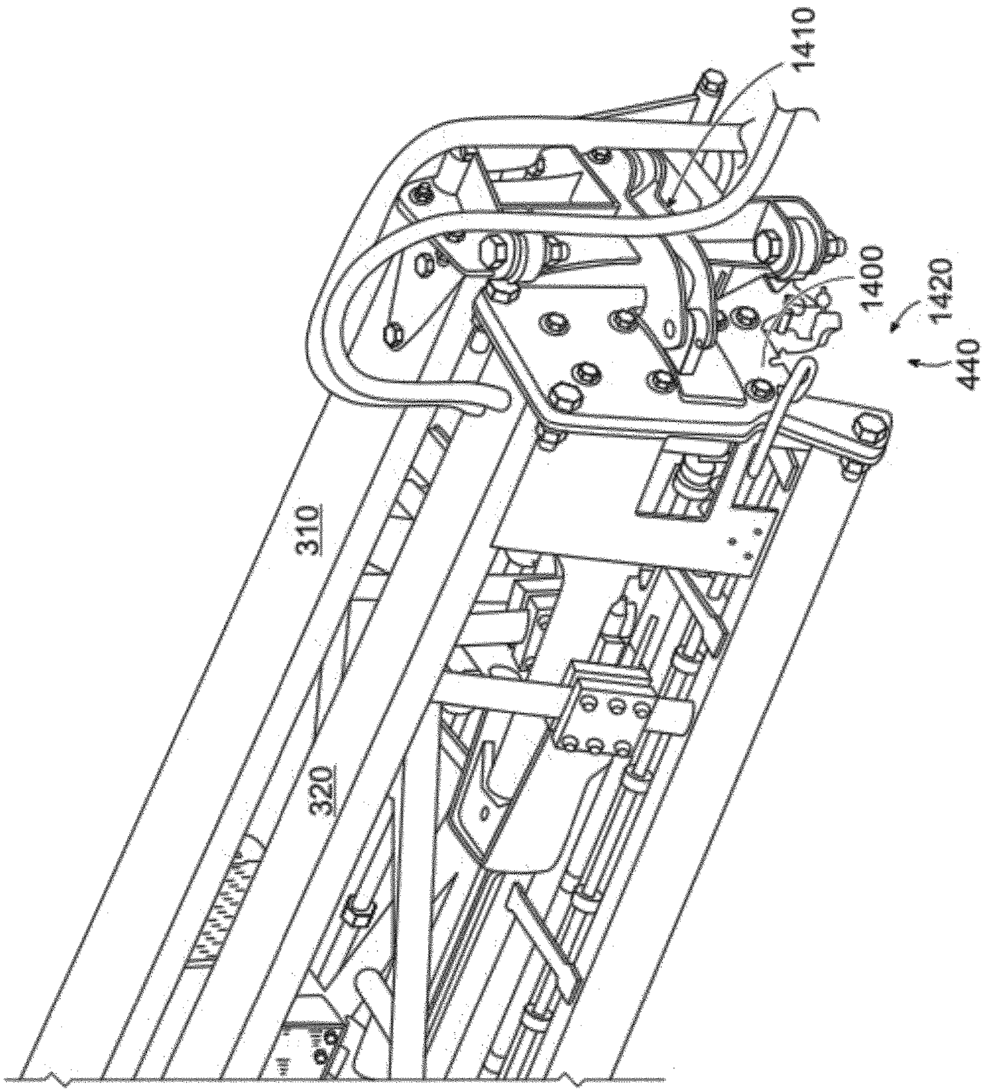
FIG. 14A is an enlarged isometric view of the main section and the middle section of the spray boom in the folded configuration.

FIG. 14A is an enlarged isometric view of the main section 310 and the middle section 320 of the spray boom 130 in the folded configuration. End plates 1400 are attached to the end of the main section 310 and the beginning of the middle section 320. A hinge 1410 is attached to the end plates 1400 to allow the main section 310 and the middle section 320 to pivot or fold with respect to each other. The hinge 1410 can be bidirectional to allow the main section 310 and the middle section 320 to pivot or fold in either direction (e.g., towards or away from each other).

In addition, a hole 1420 is defined at the bottom of each end plate 1400 to allow the channel 440 to extend through the end plates 1400.

Figure 14B:
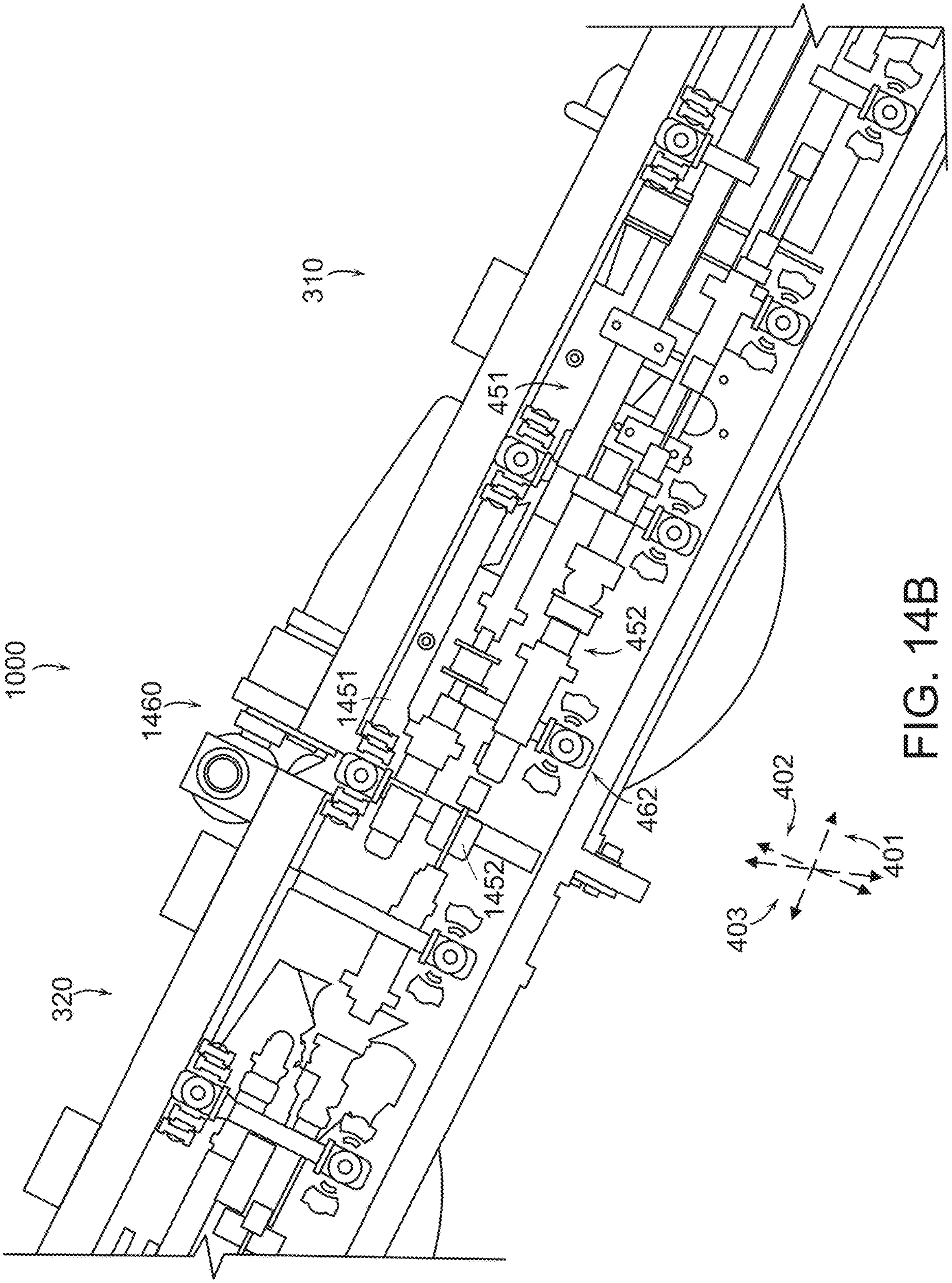
FIG. 14B is a bottom view of the interface between the main section and the middle section of the spray boom in an unfolded configuration.

FIG. 14B is a bottom view of the interface 1000 between the main section 310 and the middle section 320 in an unfolded configuration. At the interface 1000, the broadcast and SSP fluid lines 451, 452, which can be rigid (e.g., pipes) across each section of the spray boom 130, have respective flexible segments 1451, 1452 to allow the main and middle sections 310, 320 to fold.

The distance between neighboring SSP nozzles 462, as measured with respect to the first axis 401, is larger than the gap 1460 between the main and middle sections 310, 320 at the interface 1000, which allows neighboring SSP nozzles 462 to be located on either side of the gap 1460 and not in the gap 1460. A broadcast nozzle 461 can optionally be located in the gap 1460 since the alignment and orientation of the broadcast nozzles 461 can have high tolerances than those of the SSP nozzles 462.

The interface 1010 between the middle section 320 and the breakaway section 330 can be formed in the same or similar manner as the interface 1000. For example, the broadcast and SSP fluid lines 451, 452 can have flexible segments across the interface 1010. In addition, the neighboring SSP nozzles 462 can be located on either side of the interface 1010 and not in the interface 1010. A broadcast nozzle 461 can optionally be located in the interface 1010

Figure 15:
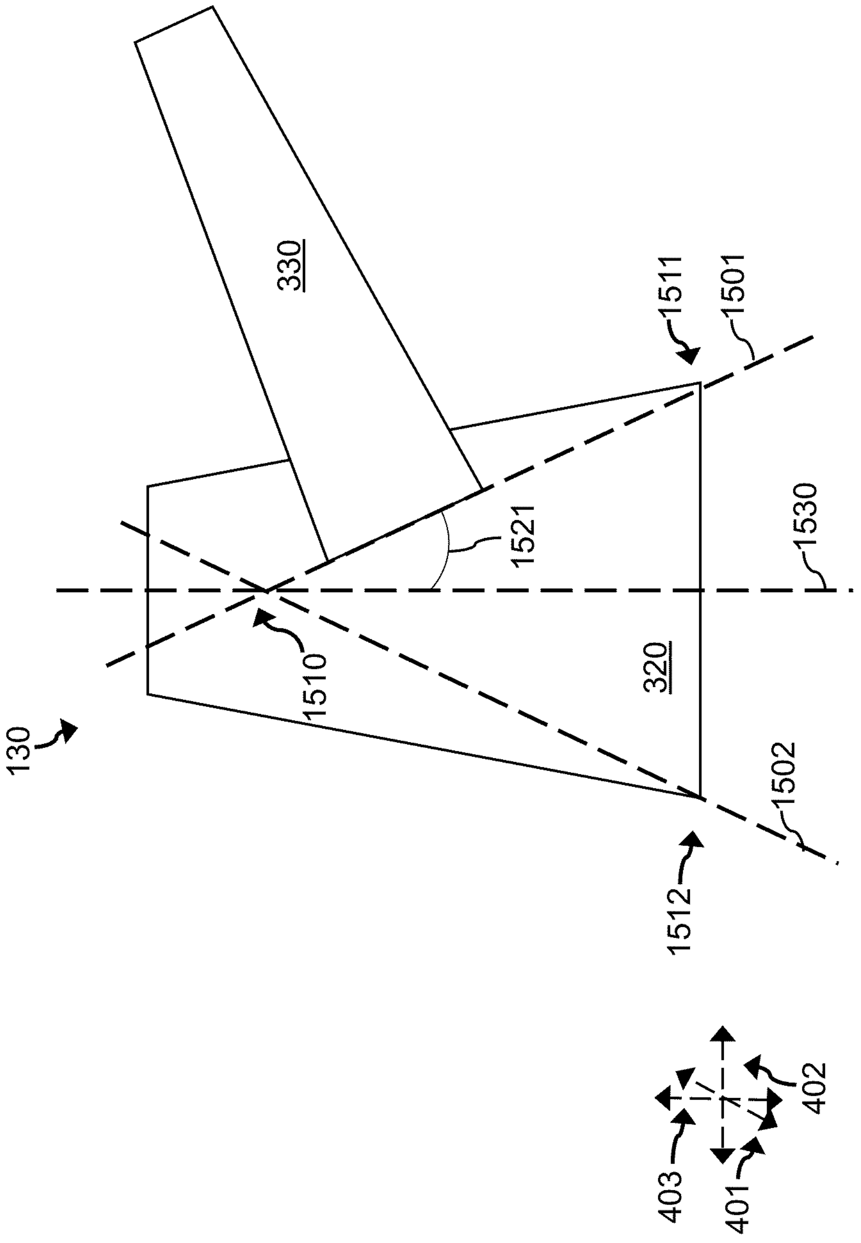
FIGS. 15 and 16 are end views of the spray boom.
Figure 16:
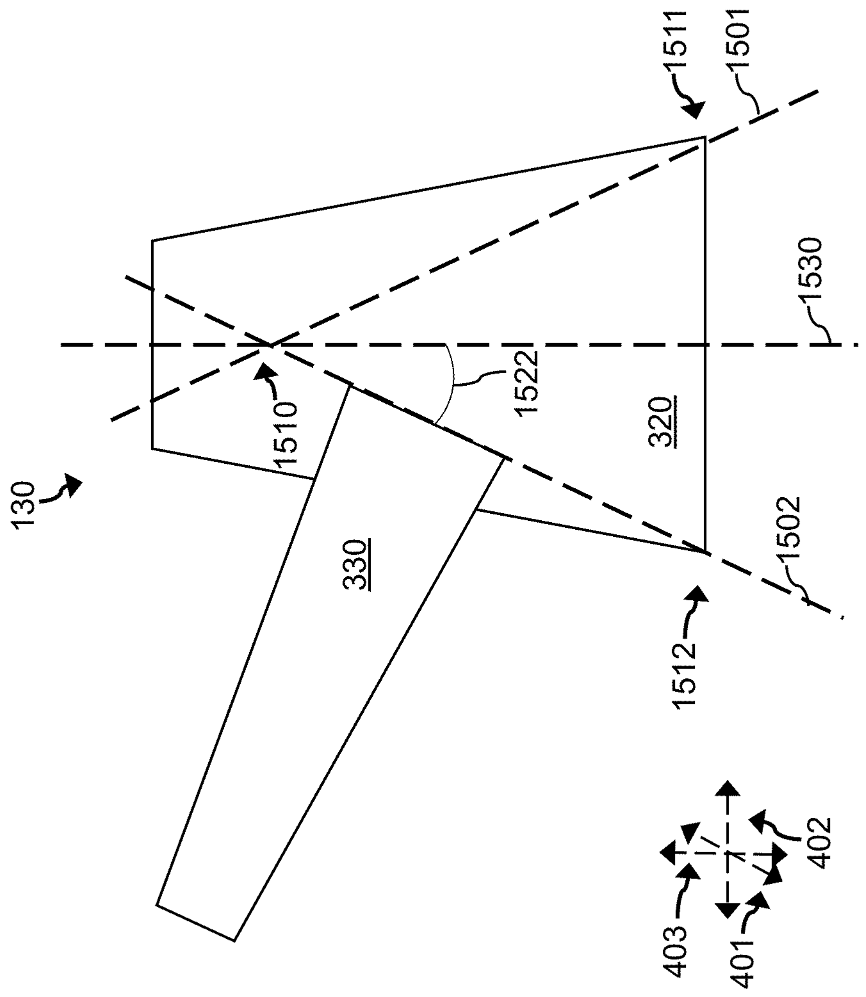

FIGS. 15 and 16 are end views of the spray boom 130 to further illustrate the functionality of the breakaway section 330. The breakaway section 330 is configured to pivot about a first breakaway axis 1501 with respect to the middle section 320 when the breakaway section 330 pivots in a first direction, as illustrated in FIG. 15. The breakaway section 330 is configured to pivot about a second breakaway axis 1502 with respect to the middle section 320 when the breakaway section 330 pivots in a second direction, as illustrated in FIG. 16. The first and second breakaway axes 1501, 1502 are oriented diagonally (e.g., relative to the second and third axes 402, 403) to lift and pivot the breakaway section 330 with respect to the middle section 320.

In the pivoted configuration, the breakaway section 330 pivots upwards (away from the ground) and inwards (towards the middle section 320) along the corresponding breakaway axis 1501, 1502. When the breakaway section 330 is pivoted in one direction, the first breakaway axis 1501 is defined by an upper pivot point 1510 and a first pivot point 1511 at the bottom of the side in the direction that the breakaway section 330 is pivoting. The first breakaway axis 1501 is oriented at a first angle 1521 relative to a vertical axis 1530, where the vertical axis is parallel to the third axis 403.

When the breakaway section 330 is pivoted in the opposite direction, the second breakaway plane/axis 1502 is defined by the upper pivot point 1510 and a second pivot point 1512 at the bottom of the side in the direction that the breakaway section is pivoting. The second breakaway axis 1502 is oriented at a second angle 1522 relative to the vertical axis 1530.

The first and second angles 1521, 1522 can be between about 5 degrees and about 20 degrees, including about 10 degrees, about 15 degrees, and any value or range between any two of the foregoing values.

Figure 17:
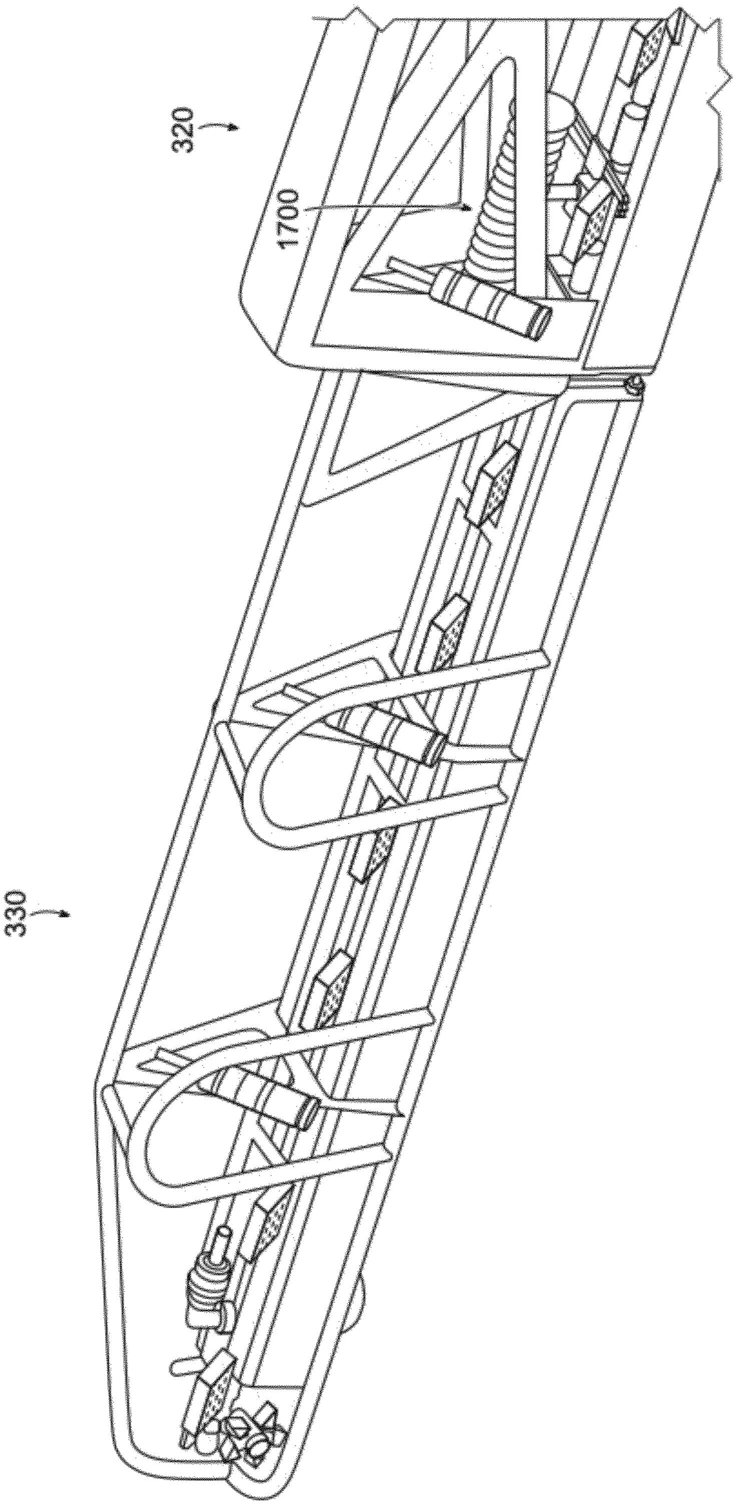
FIG. 17 is an enlarged isometric view of the middle section and the breakaway section of the spray boom.

A spring 1700 can be mechanically coupled to the breakaway section 330, for example as illustrated in FIG. 17. The spring 1700 can mechanically bias the breakaway section 330 such that the breakaway section 330 returns to a home position, parallel to the middle section 320 (e.g., as illustrated in FIG. 17) after the breakaway section 330 is pivoted (e.g., after contacting an object that causes the breakaway section 330 to pivot). The spring 1700 can be a compression spring. The spring 1700 can be mechanically attached to the middle section 320 and the breakaway section 330.

Figure 18:
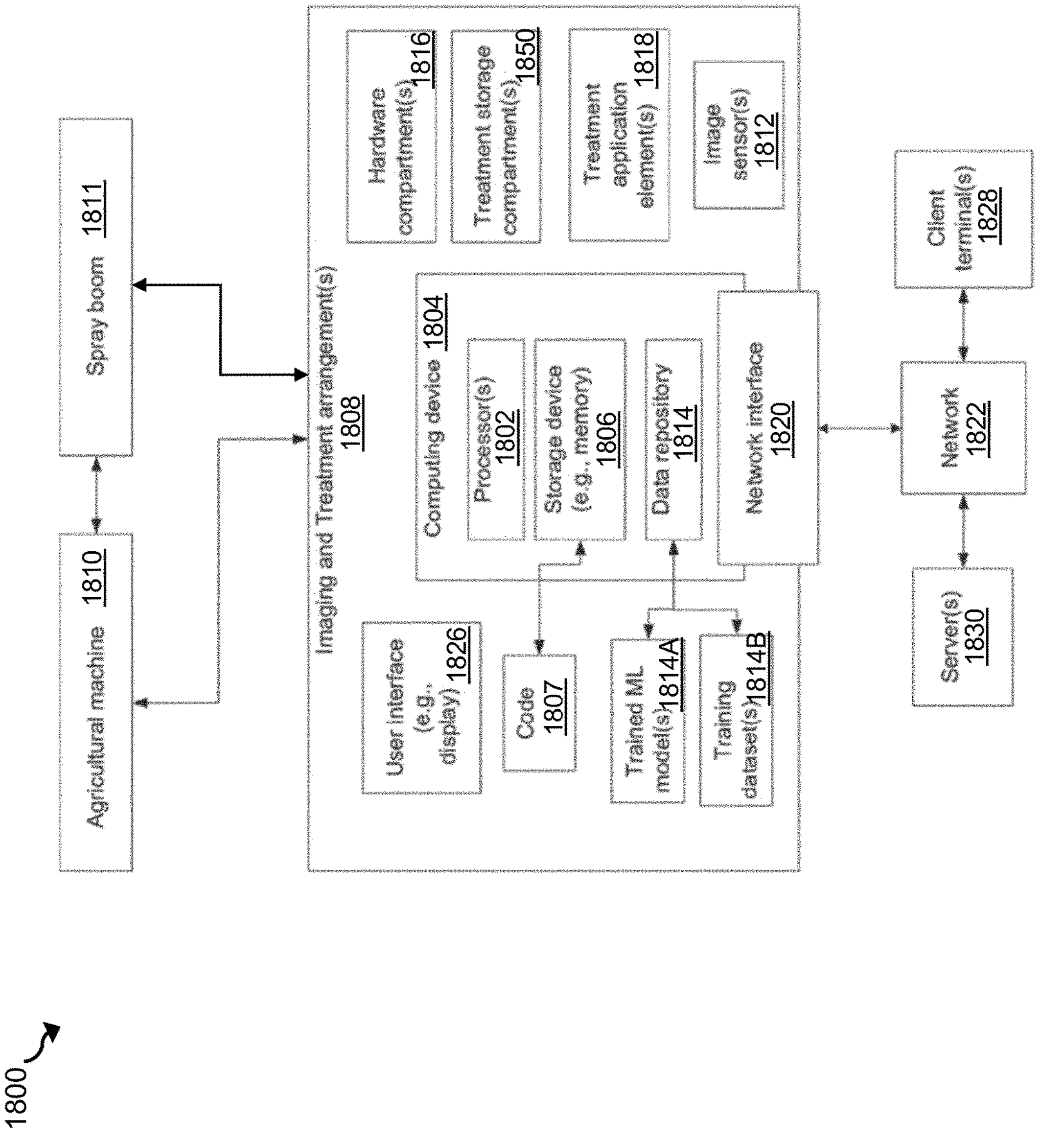
FIG. 18 is a block diagram of a system for selectively applying a treatment to a target region according to an embodiment.

FIG. 18 is a block diagram of a system 1800 for selectively applying a treatment to a target region according to an embodiment. System 1800 can be the same as system(s) 10 and/or 20.

System 1800 includes one or more imaging and treatment arrangements 1808 connected to and/or mounted on an agricultural machine 1810, for example, a tractor, an airplane, an off-road vehicle, or a drone. Agricultural machine 1810 can be the same as agricultural vehicle 100. Agricultural machine 1810 can include and/or can be connected to a spray boom 1811 and/or to another boom. Spray boom 1811 can be the same as spray boom 130. Imaging and treatment arrangements 1808 may be arranged along a length of the agricultural machine 1810 and/or of the spray boom 1811. For example, the imaging and treatment arrangements 1808 can be evenly spaced every 1-3 meters along the length of spray boom 1811. Spray boom 1811 may be long, for example, 10-50 meters, or another length. Spray boom 1811 may be pushed or pulled by agricultural machine 1810. In another embodiment, the system 1800 only includes one imaging and treatment arrangement 1808.

An example imaging and treatment arrangement 1808 is depicted for clarity, but it is to be understood that system 1800 may include multiple imaging and treatment arrangements 1808. It is noted that each imaging and treatment arrangement 1808 may include all components described herein. Alternatively, one or more imaging and treatment arrangements 1808 can share one or more components, for example, multiple imaging and treatment arrangements 1808 can share a common computing device 1804, common memory 1806, and/or common processor(s) 1802.

Each imaging and treatment arrangement 1808 includes one or more image sensors 1812 that acquire images of the agricultural field. Examples of an image sensor 1812 include a color sensor, optionally a visible light-based sensor, for example, a red-green-blue (RGB) sensor such as CCD and/or CMOS sensors, and/or other cameras (e.g., cameras 400) and/or other sensors such as an infra-red (IR) sensor, a near-infrared sensor, an ultraviolet sensor, a fluorescent sensor, a LIDAR sensor, an NDVI sensor, a three-dimensional sensor, and/or a multispectral sensor. Image sensor(s) 1812 are arranged and/or positioned to capture images of a portion of the agricultural field (e.g., located in front of image sensor(s) 1812 and along a direction of motion of agricultural machine 1810).

A computing device 1804 receives the image(s) from image sensor(s) 1812, for example, via a direct connection (e.g., local bus and/or cable connection and/or short-range wireless connection), a wireless connection and/or via a network. The image(s) are processed by processor(s) 1802, which feeds the image into a trained machine learning (ML) model 1814A (e.g., trained on a training dataset(s) 1814B that include training images of agricultural fields with target weeds and training images of agricultural fields without target weeds). Training dataset(s) 1814B are used to train the trained ML model 1814A and may not be included in system 1800 in some embodiments.

The trained ML model 1814A can be configured to detect a target growth, such as one or more weeds, within the image(s), that is separate from a desired growth (e.g., a crop). One treatment storage compartment 1850 may be selected from multiple treatment storage compartments according to the outcome of trained ML model 1814A, for administration of a treatment by one or more treatment application element(s), as described herein. For example, an SSP tank (e.g., SSP tank 112) can be selected to provide treatment in response to the detection of a target weed. In some embodiments, only the valve(s) associated with the camera 400 (FIG. 4) (or other image sensor(s) 1812) and with the position(s) of the detected weed in the image(s) are activated to precisely target the detected weed. In contrast, the broadcast tank (e.g., broadcast tank 111) can continually apply treatment to all or substantially all areas of the agricultural field, for example as a preventative for future weed growth and/or as a general herbicide.

Hardware processor(s) 1802 of computing device 1804 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 1802 may include a single processor, or multiple processors (homogenous or heterogeneous) arranged for parallel processing, as clusters and/or as one or more multi core processing devices.

Storage device (e.g., memory) 1806 stores code instructions executable by hardware processor(s) 1802, for example, a random-access memory (RAM), read-only memory (ROM), and/or a storage device, for example, non-volatile memory, magnetic media, semiconductor memory devices, hard drive, removable storage, and optical media (e.g., DVD, CD-ROM). Memory 1806 stores code 1807 that implements one or more features and/or instructions to be executed by the hardware processor(s) 1802. Memory 1806 can comprise or consist of solid-state memory and/or a solid-state device.

Computing device 1804 may include a data repository 1814 (e.g., storage device(s)) for storing data, for example, trained ML model(s) 1814A which may include a detector component and/or a classifier component. The data repository 1814 also stores the captured real-time images taken with the respective image sensor 1812. The data repository 1814 may be implemented as, for example, a computer memory, a local hard-drive, a solid-state drive, a solid-state memory, virtual storage, a removable storage unit, an optical disk, a storage device, and/or as a remote server and/or computing cloud (e.g., accessed using a network connection). Additional details regarding the trained ML model(s) 1814A, the training dataset(s) 1814B, and/or other components of system 1800 are described in U.S. Pat. No. 11,393,049, titled "Machine Learning Models For Selecting Treatments For Treating an Agricultural Field," which is hereby incorporated by reference.

Computing device 1804 is in communication with one or more treatment storage compartment(s) (e.g., tanks) 1850 and/or treatment application elements 1818 (e.g., including respective valves) that apply treatment for treating the field and/or plants growing on the field. There may be two or more treatment storage compartment(s) 1850, for example, one or more compartments (e.g., SSP tank 112) storing chemical(s) specific to a target growth such as one or more weeds, and another one or more compartments (e.g., broadcast tank 111) storing broad chemical(s) that are non-specific to target growths such as designed for different types of weeds and/or for the prevention of weed growth. One or more of the treatment storage compartment(s) 1850 can comprise a portion of a direct injection system. In an embodiment, the system 1800 can include a first direct injection system for the chemical(s) specific to a target growth (e.g., one or more weeds) and/or a second direct injection system for the broad chemical(s) that are non-specific to target growths.

There may be one or multiple treatment application elements 1818 connected to the treatment storage compartment(s) 1850, for example, one or more spot sprayers (e.g., SSP nozzles 462) connected to a first compartment (e.g., SSP tank 112) storing specific chemicals for one or more weeds, and one or more broad sprayers (e.g., broadcast nozzles 461) connected to a second compartment (e.g., broadcast tank 111) storing non-specific chemicals for different types of weeds. A respective valve can be opened and closed to drive fluid through each spot sprayer(s). Alternatively, each spot sprayer can include a respective valve. In some embodiments, the spray boom 1811 can include one or more height sensors that can be used to dynamically adjust the timing of the spot sprayers.

Other examples of treatments and/or treatment application elements 1818 include: gas application elements that apply a gas, electrical treatment application elements that apply an electrical pattern (e.g., electrodes to apply an electrical current), mechanical treatment application elements that apply a mechanical treatment (e.g., sheers and/or cutting tools and/or high pressure-waterjets for pruning crops and/or removing weeds), thermal treatment application elements that apply a thermal treatment, steam treatment application elements that apply a steam treatment, and laser treatment application elements that apply a laser treatment.

Computing device 1804 and/or imaging and treatment arrangement 1808 may include a network interface 1820 for connecting to a network 1822, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 1804 and/or imaging and treatment arrangement 1808 may communicate with one or more client terminals 1828 (e.g., smartphones, mobile devices, laptops, smart watches, tablets, desktop computer) and/or with a server(s) 1830 (e.g., web server, network node, cloud server, virtual server, virtual machine) over network 1822. Client terminals 1828 may be used, for example, to remotely monitor imaging and treatment arrangement(s) 1808 and/or to remotely change parameters thereof. Server(s) 1830 may be used, for example, to remotely collect data from multiple imaging and treatment arrangement(s) 1808 optionally of different agricultural machines, for example, to create new training datasets and/or update exiting training datasets for updating the ML models with new images.

Network 1822 may be implemented as, for example, the internet, a local area network, a wire-area network, a virtual network, a wireless network, a cellular network, a local bus, a point-to-point link (e.g., wired), and/or combinations of the aforementioned.

Computing device 1804 and/or imaging and treatment arrangement 1808 includes and/or is in communication with one or more physical user interfaces 1826 that include a mechanism for user interaction, for example, to enter data (e.g., define threshold and/or set of rules) and/or to view data (e.g., results of which treatment was applied to which portion of the field).

Example physical user interfaces 1826 include, for example, a touchscreen, a display, gesture activation devices, a keyboard, a mouse, and/or voice-activated software using speakers and a microphone. Alternatively, client terminal 1828 serves as the user interface by communicating with computing device 1804 and/or server 1830 over network 1822.

Treatment application elements 1818 may be adapted for spot spraying and/or broad (e.g., band) spraying, for example as described in U.S. Provisional Patent Application No. 63/149,378, filed on Feb. 15, 2021, and/or in U.S. Pat. No. 11,393,049, which are hereby incorporated by reference.

System 1800 may include a hardware component 1816 associated with the agricultural machine 1810 for dynamic adaption of the herbicide applied by the treatment application element(s) 1818 according to dynamic orientation parameter(s) computed by analyzing an overlap region of images captured by image sensors 1812, for example as described in U.S. Provisional Patent Application No. 63/082,500, filed on Sep. 24, 2020, and/or in U.S. Pat. No. 11,393,049, which are hereby incorporated by reference.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A configurable spray boom comprising:

a boom frame extending along a first axis, the boom frame including an upper support and a lower support, the upper and lower supports separated from each other with respect to a vertical axis, the first axis orthogonal to the vertical axis;

a plurality of camera frames attached to the upper and lower supports, each camera frame including first and second supports that are separated from each other with respect to a second axis that is orthogonal to the first axis and to the vertical axis, each camera frame having a vertical plane of symmetry that is parallel to a plane defined by the second and vertical axes, the plurality of camera frames evenly spaced, with respect to the first axis, along the boom frame; and a plurality of cameras, wherein:

the configurable spray boom is configurable between first and second configurations, when the configurable spray boom is in the first configuration, a respective camera is mounted on the first support of each camera frame such that the respective camera is oriented in a first direction, relative to the configurable spray boom, to capture images in the first direction, and when the configurable spray boom is in the second configuration, the respective camera is mounted on the second support of each camera frame such that the respective camera is oriented in a second direction, relative to the configurable spray boom, to capture images in the second direction.

2. The spray boom of claim 1, wherein the boom frame is symmetric with respect to a center of the configurable spray boom.

3. The spray boom of claim 1, wherein:

a channel is defined in the lower support, the channel extending parallel to the first axis and along a length of the spray boom, and the spray boom further comprises:

a broadcast fluid line extending through the channel and parallel to the first axis; and a selective spot spray (SSP) line extending through the channel and parallel to the first axis.

4. The spray boom of claim 3, further comprising:

a plurality of broadcast nozzles fluidly coupled to the broadcast fluid line, the plurality of broadcast nozzles adjustably spaced apart along the channel; and a plurality of SSP nozzles fluidly coupled to the SSP fluid line, the plurality of SSP nozzles adjustably spaced apart along the channel, whereby the plurality of broadcast nozzles and the plurality of SSP nozzles can be positioned at any location along the length of the spray boom without obstruction from the spray boom.

5. The spray boom of claim 4, further comprising a plurality of nozzle holders adjustably attached to the lower support, each nozzle holder attached to a respective SSP nozzle.

6. The spray boom of claim 3, wherein the channel is defined between first and second portions of the lower support.

7. The spray boom of claim 1, wherein:
the boom frame includes first and second sides, each side including a plurality of sections,
neighboring sections are pivotably coupled to each other at respective interfaces,
the plurality of SSP nozzles are spaced apart along a length of the spray boom,
a distance between neighboring SSP nozzles is less than a distance between the neighboring sections of the boom frame, and
the plurality of SSP nozzles are configured to be positionally offset from the respective interfaces.

8. The spray boom of claim 1, wherein:
each camera has a respective field of view (FOV), and
a spacing between neighboring camera frames is configured such that the respective FOVs of neighboring cameras at least partially overlap when the spray boom is in the first configuration and when the spray boom is in the second configuration to provide an overall FOV that is continuous.

9. The spray boom of claim 8, wherein the cameras are mounted at a predetermined angle when the spray boom is in the first configuration and when the spray boom is in the second configuration.

10. The spray boom of claim 8, further comprising a plurality of illumination sources mounted on the lower support, the illumination sources positioned between the neighboring camera frames to provide uniform lighting within the respective FOV of each camera.

11. The spray boom of claim 10, wherein:
the lower support includes first and second portions, the first and second portions defining a channel therebetween,
when the spray boom is in the first configuration, the illumination sources are mounted on the second portion of the lower support such that the illumination sources are oriented in the first direction, relative to the configurable spray boom, to illuminate the respective FOV in the first direction, and
when the spray boom is in the second configuration, the illumination sources are mounted on the first portion of the lower support such that the illumination sources are oriented in the second direction, relative to the configurable spray boom, to illuminate the respective FOV in the second direction.

12. The spray boom of claim 1, further comprising a plurality of camera housings, each camera housing having an open cavity to receive the respective camera, the open cavity having an open end that is aligned with a field of view of the respective camera.

13. A configurable dual sprayer system comprising:
an agricultural vehicle;
a broadcast tank mounted on the agricultural vehicle, the broadcast tank holding one or more general-application liquid chemicals for preventing undesirable plants from growing in an agricultural field;
a selective-spot spray (SSP) tank mounted on the agricultural vehicle, the SSP tank holding one or more specific liquid chemicals for treating one or more target weeds growing in the agricultural field; and
a spray boom attached to the agricultural vehicle, the spray boom including:
a boom frame extending along a first axis, the boom frame including an upper support and a lower support, the upper and lower supports separated from each other with respect to a vertical axis, the first axis orthogonal to the vertical axis;
a plurality of camera frames attached to the upper and lower supports, each camera frame including first and second supports that are separated from each other with respect to a second axis that is orthogonal to the first axis and to the vertical axis, each camera frame having a vertical plane of symmetry that is parallel to a plane defined by the second and vertical axes, the plurality of camera frames evenly spaced, with respect to the first axis, along the boom frame;
a plurality of cameras;
a plurality of broadcast nozzles mounted on the boom frame, the plurality of broadcast nozzles fluidly coupled to the broadcast tank; and
a plurality of SSP nozzles mounted on the boom frame, the plurality of SSP nozzles fluidly coupled to the SSP tank,
wherein:
the spray boom is configurable between first and second configurations,
when the spray boom is in the first configuration, a respective camera is mounted on the first support of each camera frame such that the respective camera is oriented in a first direction, relative to the configurable spray boom, to capture images in the first direction, and
when the spray boom is in the second configuration, the respective camera is mounted on the second support of each camera frame such that the respective camera is oriented in a second direction, relative to the configurable spray boom, to capture images in the second direction.

14. The configurable dual sprayer system of claim 13, wherein:
when the spray boom is in the first configuration, a first side of the spray boom is attached to a front of the agricultural vehicle, and
when the spray boom is in the second configuration, a second side of the spray boom is attached to a back of the agricultural vehicle.

15. The configurable dual sprayer system of claim 13, wherein:
a channel is defined in the lower support, the channel extending parallel to the first axis and along a length of the spray boom, and
the spray boom further comprises:
a broadcast fluid line extending through the channel and parallel to the first axis, the broadcast fluid line fluidly coupled to the broadcast tank and to the plurality of broadcast nozzles; and
an SSP fluid line extending through the channel and parallel to the first axis, the SSP fluid line fluidly coupled to the SSP tank and to the plurality of SSP nozzles.

16. The configurable dual sprayer system of claim 15, wherein:
the plurality of broadcast nozzles are disposed in the channel and adjustably spaced apart along the channel, and
the plurality of SSP nozzles are disposed in the channel and adjustably spaced apart along the channel,
whereby the plurality of broadcast nozzles and the plurality of SSP nozzles can be positioned at any location along the length of the spray boom without obstruction from the spray boom.

17. The configurable dual sprayer system of claim 15, wherein the channel is defined between first and second portions of the lower support.

18. The configurable dual sprayer system of claim 15, further comprising:

a first recirculation line fluidly coupled to the broadcast fluid line and to the broadcast tank;

a second recirculation line fluidly coupled to the SSP fluid line and to the SSP tank, the first and second recirculation lines extending between the upper and lower supports of the boom frame, wherein:

the boom frame includes first and second sides, each side including a plurality of sections, neighboring sections are pivotably coupled to each other, and the first and second recirculation lines pass over the upper support of the boom frame between the neighboring sections.

19. The configurable dual sprayer system of claim 13, further comprising:

a plurality of air nozzles, each air nozzle configured to direct compressed air onto a respective camera lens of the respective camera;

one or more compressed air lines fluidly coupled to the plurality of air nozzles; and a pressurized air tank mounted on the agricultural vehicle, the pressurized air tank fluidly coupled to the one or more compressed air lines.

20. The configurable dual sprayer system of claim 13, wherein the boom frame is symmetric with respect to a center of the spray boom.

* * * * *